US007007298B1

(12) United States Patent
Shinzaki et al.

(10) Patent No.: US 7,007,298 B1
(45) Date of Patent: Feb. 28, 2006

(54) APPARATUS AND METHOD FOR AUTHENTICATING USER ACCORDING TO BIOMETRIC INFORMATION

(75) Inventors: Takashi Shinzaki, Kanagawa (JP); Yusaku Fujii, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/492,696

(22) Filed: Jan. 27, 2000

(30) Foreign Application Priority Data

Mar. 12, 1999 (JP) ................................. 11-067340

(51) Int. Cl.
*H04L 9/00* (2006.01)
(52) U.S. Cl. .......................... 726/3; 713/186; 382/115
(58) Field of Classification Search .............. 713/201, 713/182, 186; 382/115–119; 340/5.52; 726/3

See application file for complete search history.

(56) References Cited

U.S. PATENT DOCUMENTS

| 5,229,764 | A * | 7/1993 | Matchett et al. ........... 340/5.52 |
| 6,104,922 | A * | 8/2000 | Baumann .................... 455/410 |
| 6,181,803 | B1 * | 1/2001 | Davis .......................... 382/115 |
| 6,219,439 | B1 * | 4/2001 | Burger ....................... 382/115 |
| 6,317,834 | B1 * | 11/2001 | Gennaro et al. ............ 713/186 |
| 6,424,249 | B1 * | 7/2002 | Houvener ................... 340/5.82 |
| 6,751,733 | B1 * | 6/2004 | Nakamura et al. .......... 713/182 |

FOREIGN PATENT DOCUMENTS

| JP | 9-147104 | 6/1997 |
| JP | 9-297844 | 11/1997 |
| JP | 9-297845 | 11/1997 |

* cited by examiner

*Primary Examiner*—Hosuk Song
*Assistant Examiner*—T. B. Truong
(74) *Attorney, Agent, or Firm*—Westerman, Hattori, Daniels & Adrian, LLP

(57) ABSTRACT

An apparatus and a method authenticates a user according to biometric information such as a fingerprint, voice, etc. A biometric information input unit inputs biometric information. An extraction unit extracts biometric information extracts biometric feature information from the input biometric information. An estimation unit estimates the matching precision of the extracted biometric feature information. A request unit requests an input of additional authentication information. An authentication information input unit inputs authentication information. A biometric feature information registration unit preliminarily stores registered biometric feature information. An authentication information registration unit preliminarily stores additional registered authentication information. A biometric feature information matching check unit has a matching check between the extracted biometric feature information and the registered biometric feature information. An authentication information matching check unit has a matching check between the input authentication information and the registered authentication information. A determination unit computes the matching precision by combining the matching check result about the biometric feature information with the matching check result about the additional authentication information, and determines based on the computation result whether or not the user is authenticated.

23 Claims, 34 Drawing Sheets

| MATCHING SCORE | 1 | 2 | 3 | 4 | 5 | 6 |
|---|---|---|---|---|---|---|
| OTHER PERSON ACCEPTABILITY RATE | 1/1000000 | 1/100000 | 1/10000 | 1/1000 | 1/100 | 1/10 |

F I G. 3

| MATCHING SCORE | 1 1 | 1 2 | 1 3 | 1 4 | 1 5 |
|---|---|---|---|---|---|
| OTHER PERSON ACCEPTABILITY RATE | 1/100000 | 1/10000 | 1/1000 | 1/100 | 1/10 |

F I G. 4

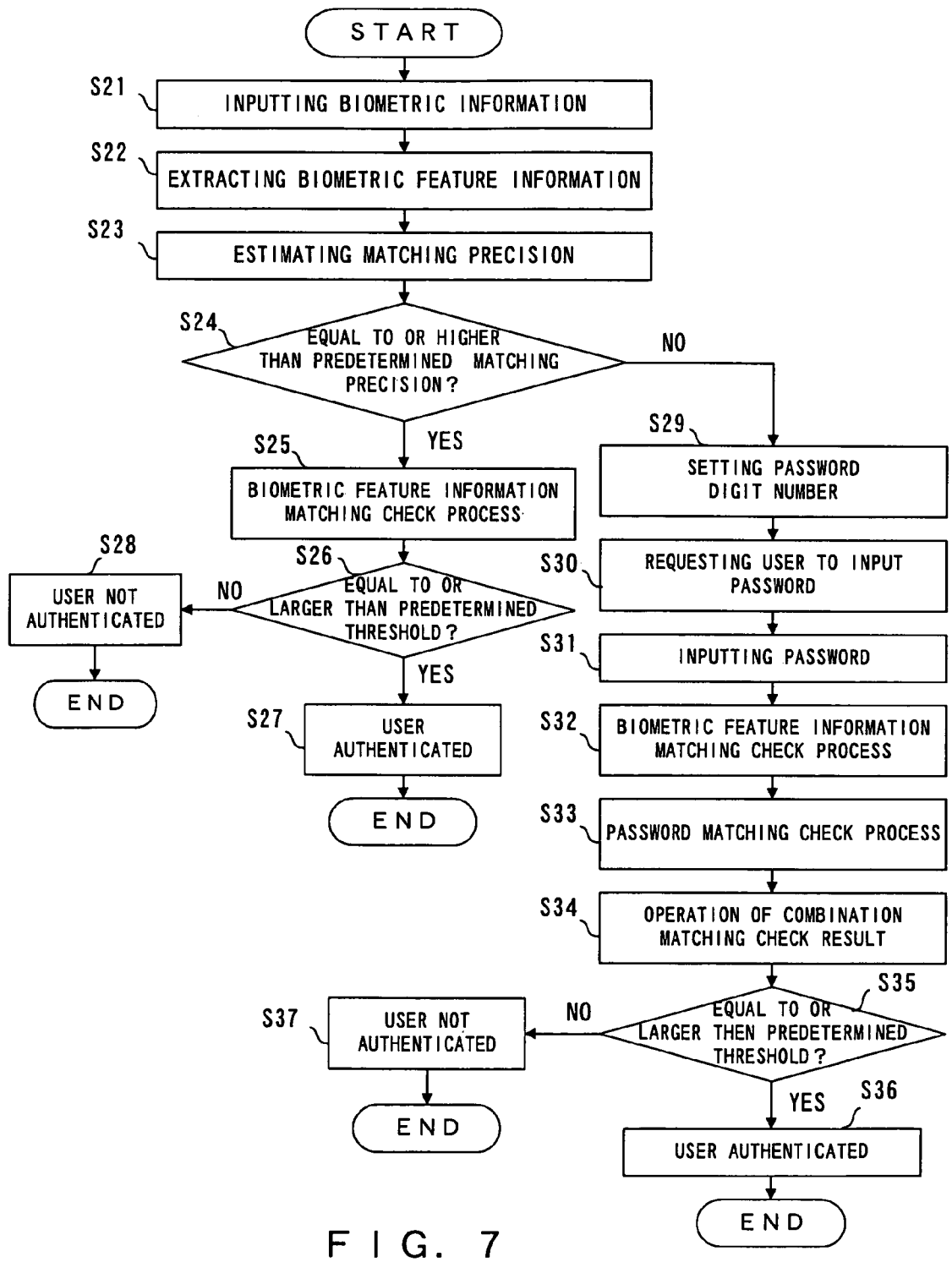
F I G. 7

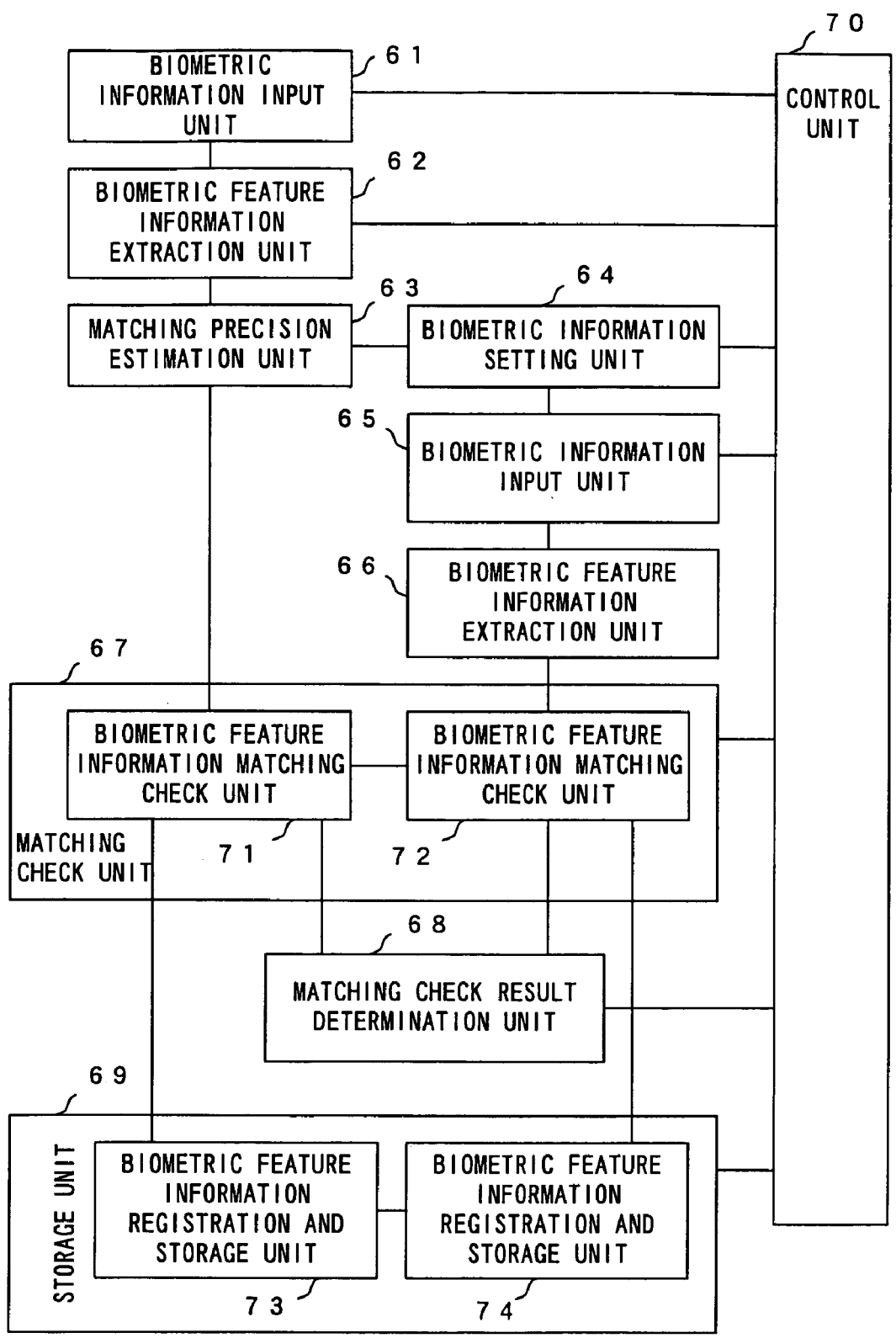
F I G. 10

MATCHING CHECK DATA

BIOMETRIC FEATURE INFORMATION

AUXILIARY INFORMATION

AUXILIARY INFORMATION

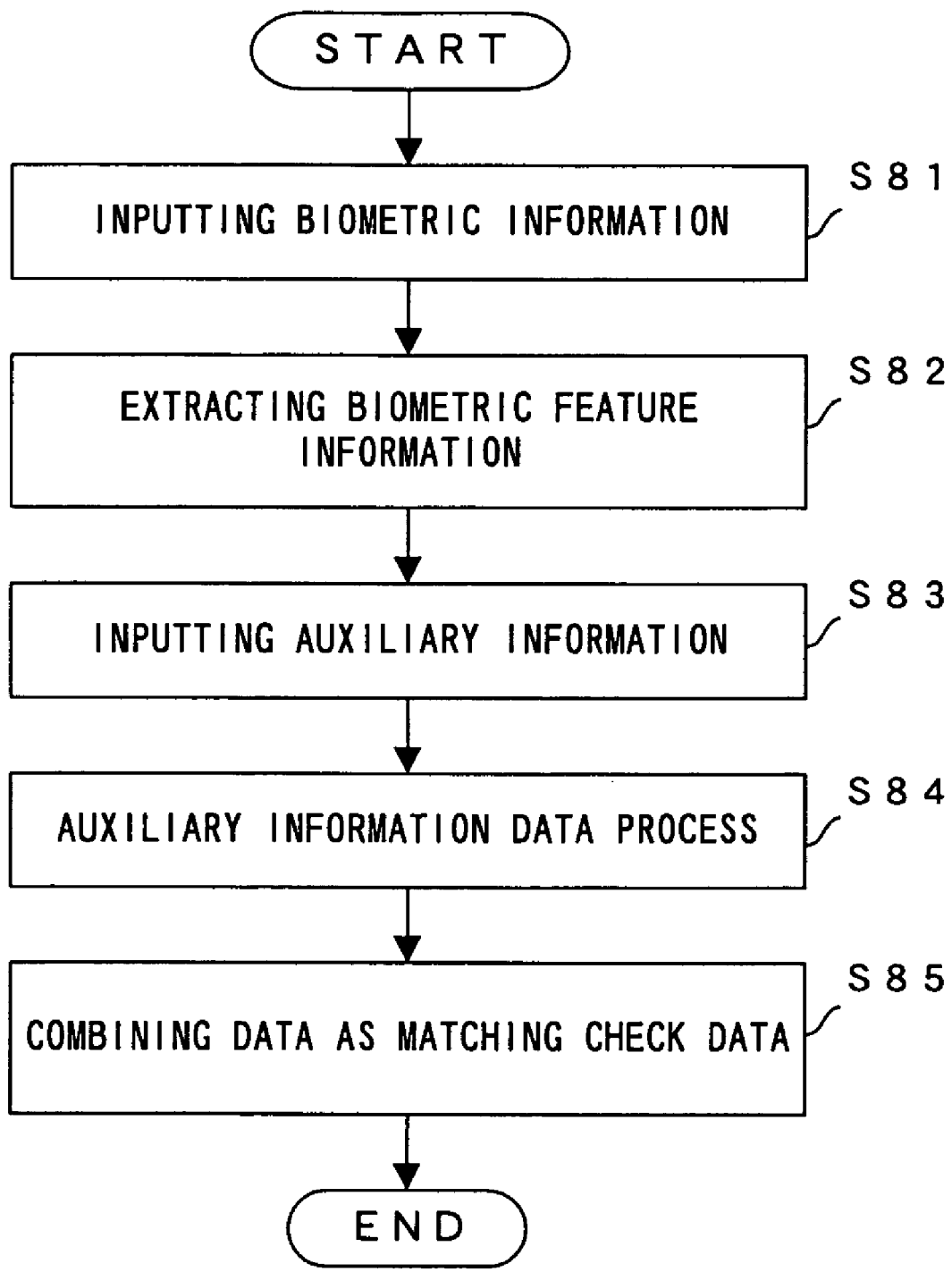
F I G. 1 3

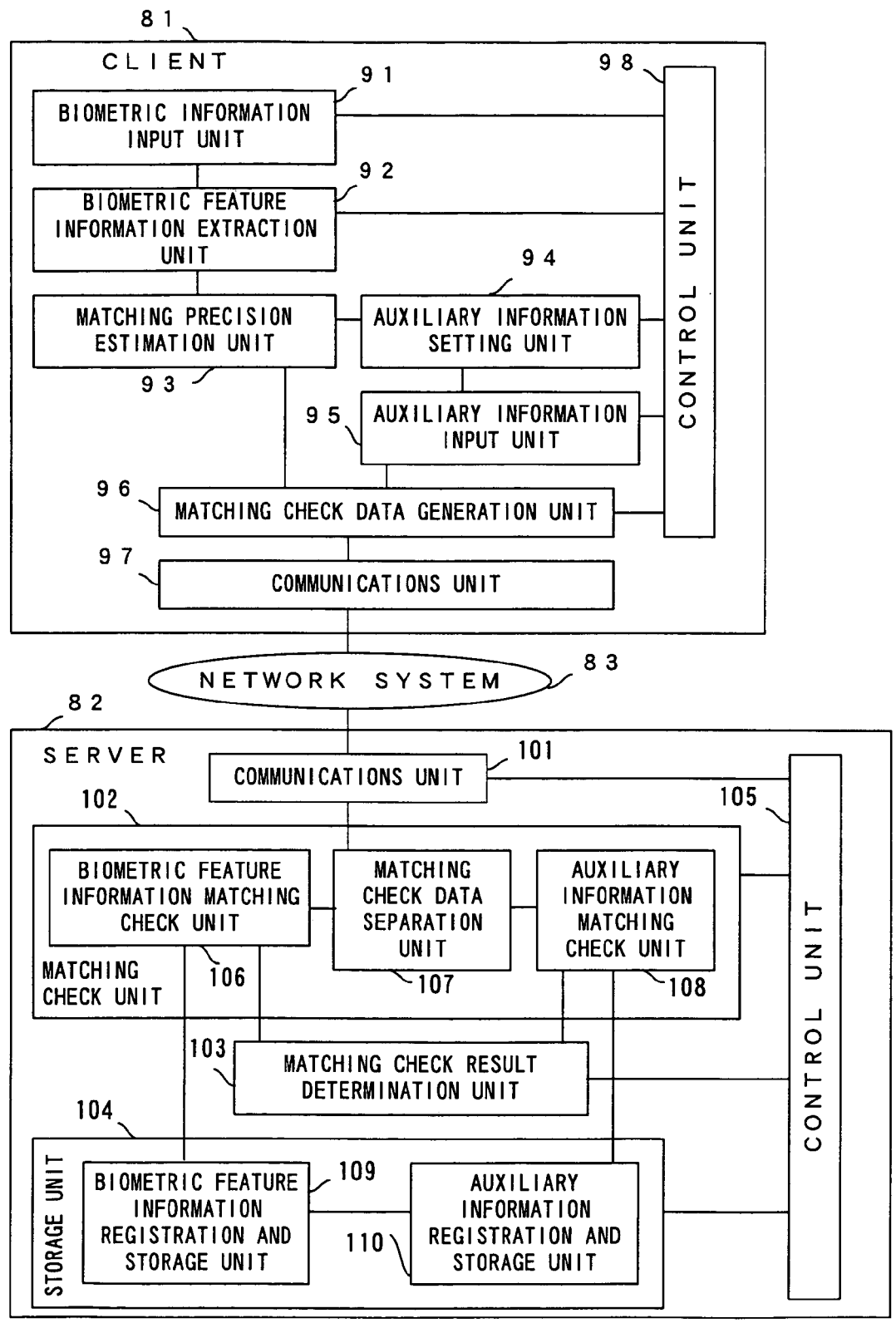
F I G. 14

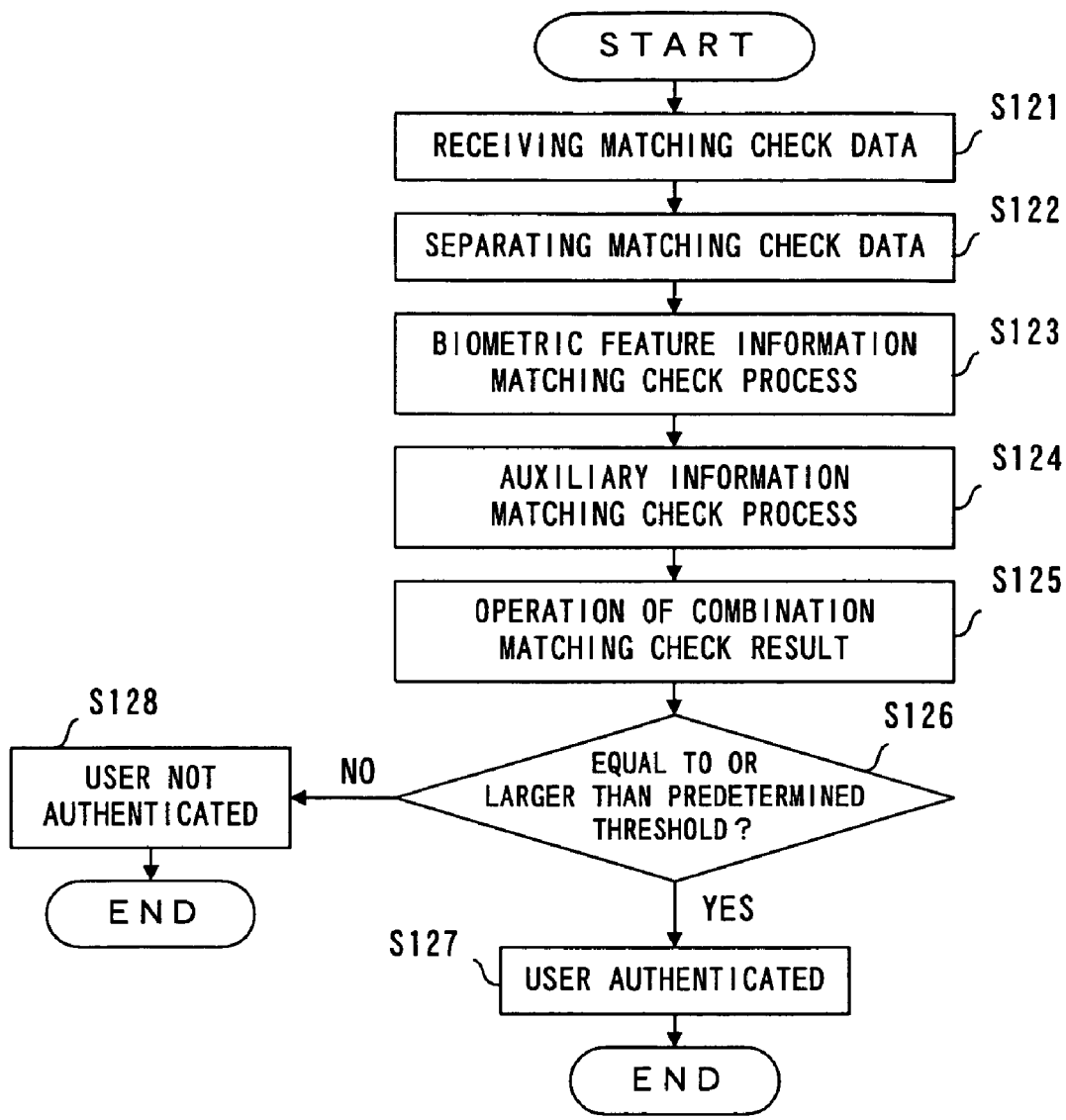
F I G. 1 7

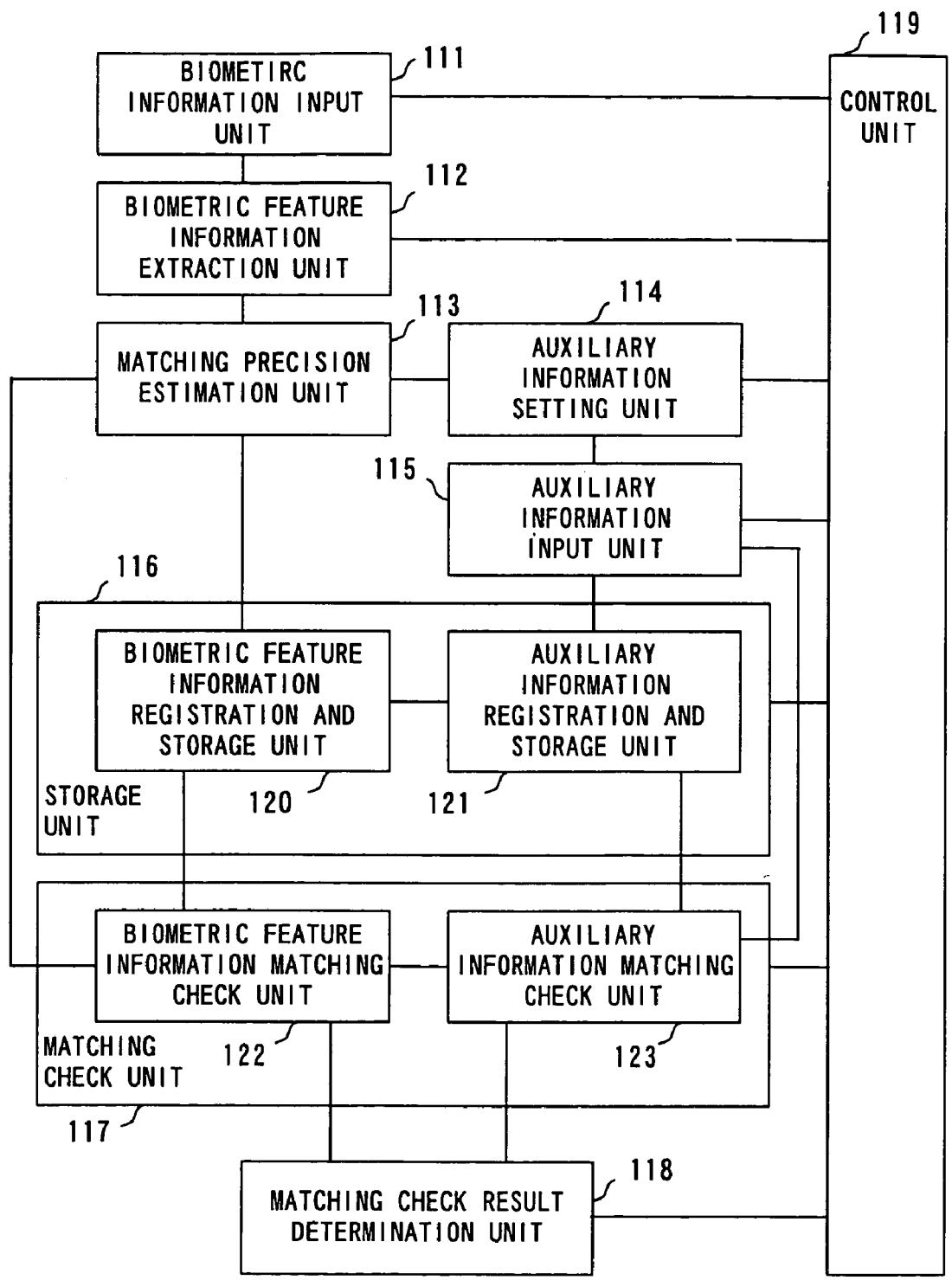
F I G. 18

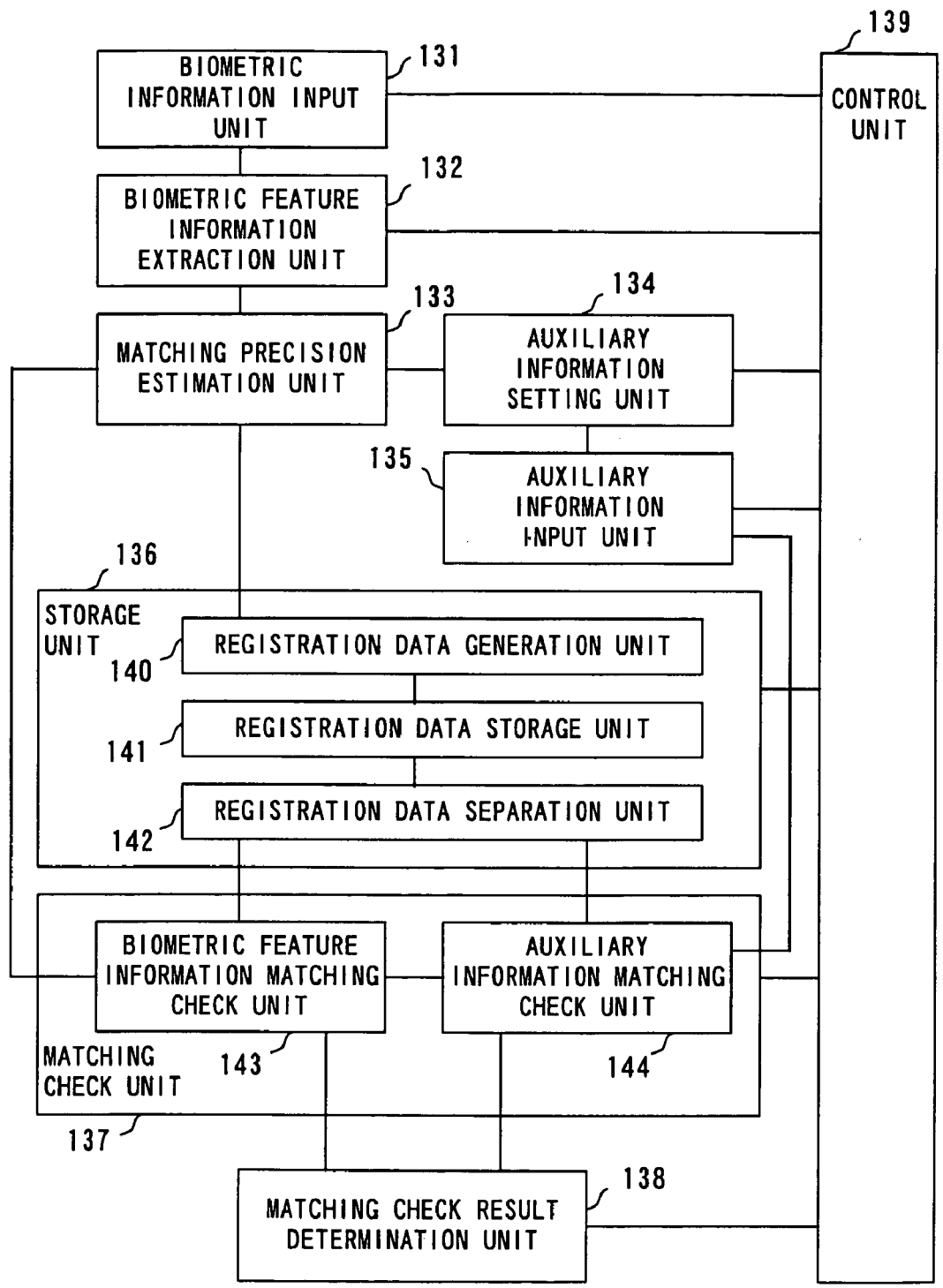
F I G. 2 1

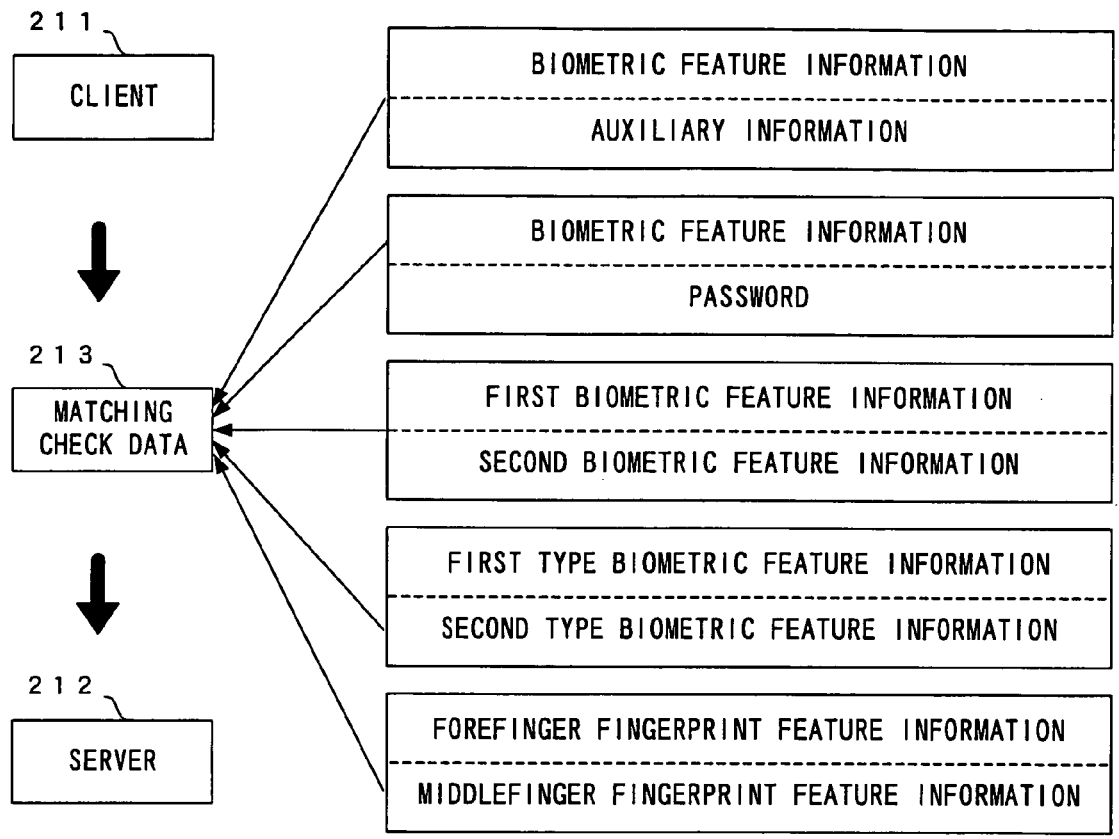
F I G. 29
F I G. 30

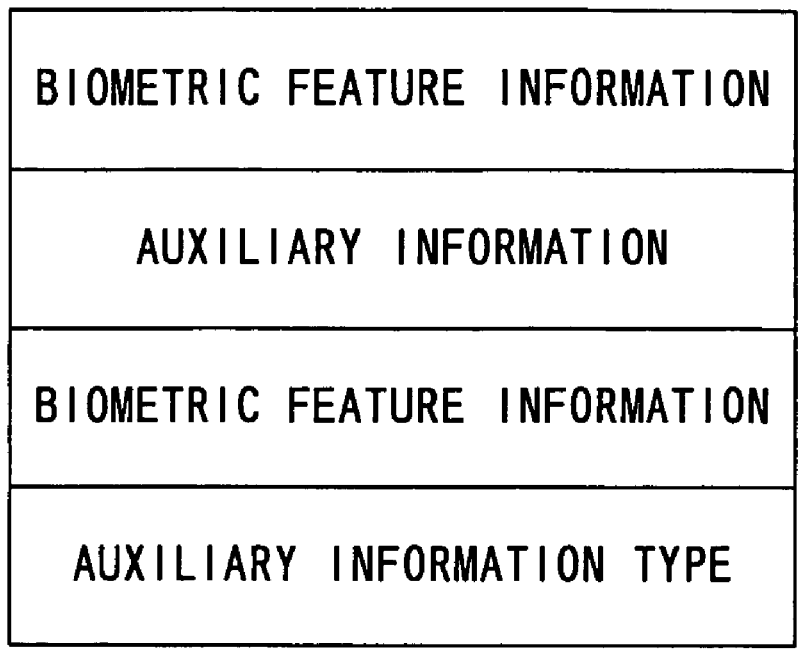
F I G. 3 1
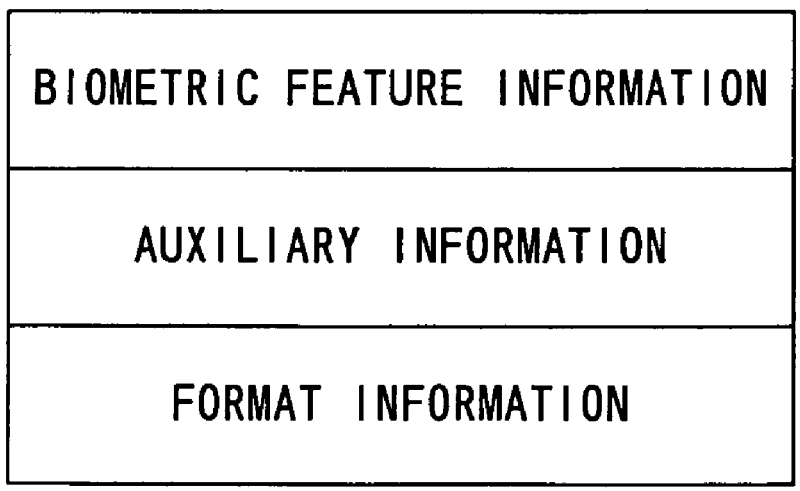
F I G. 3 2

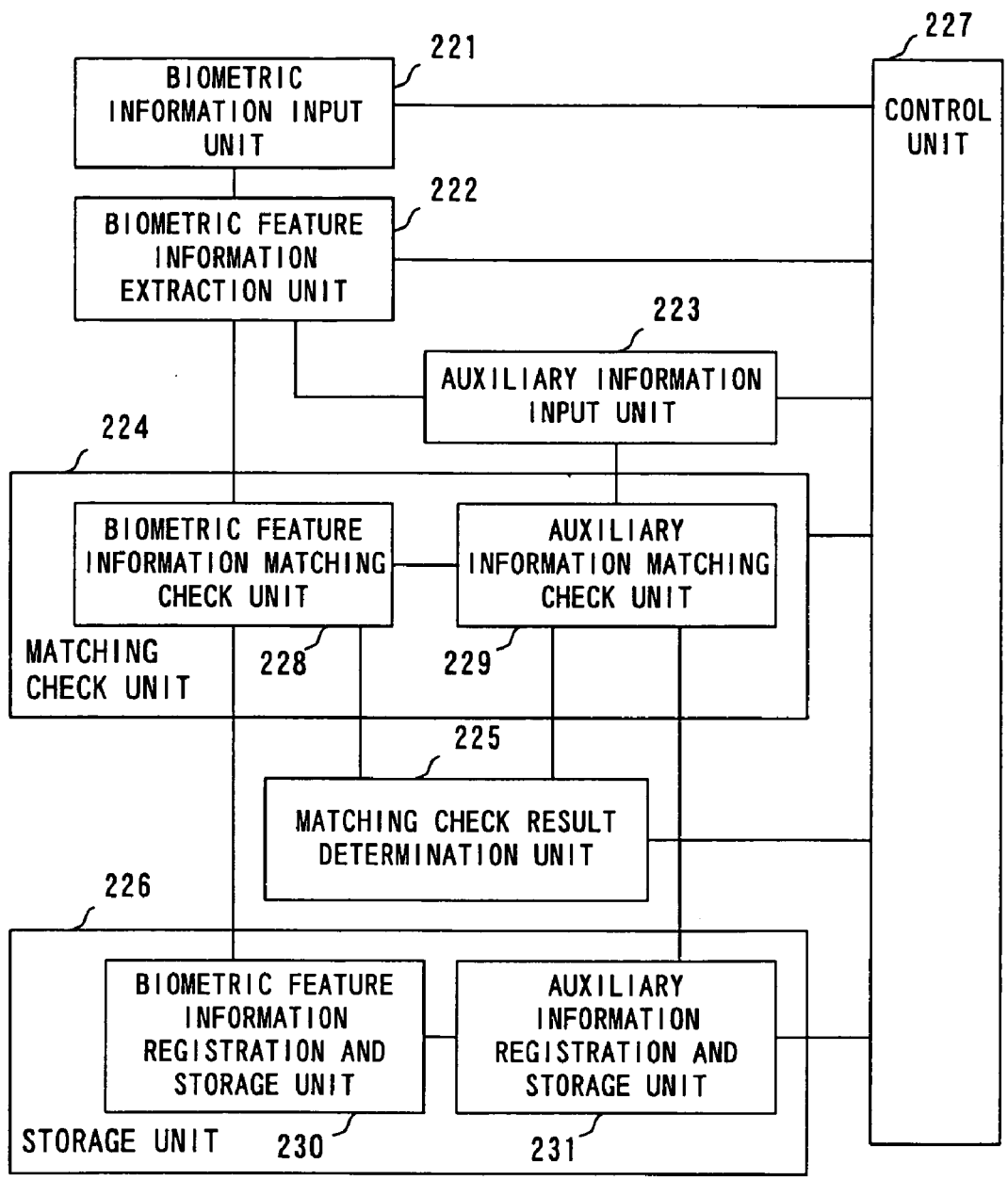
F I G. 33

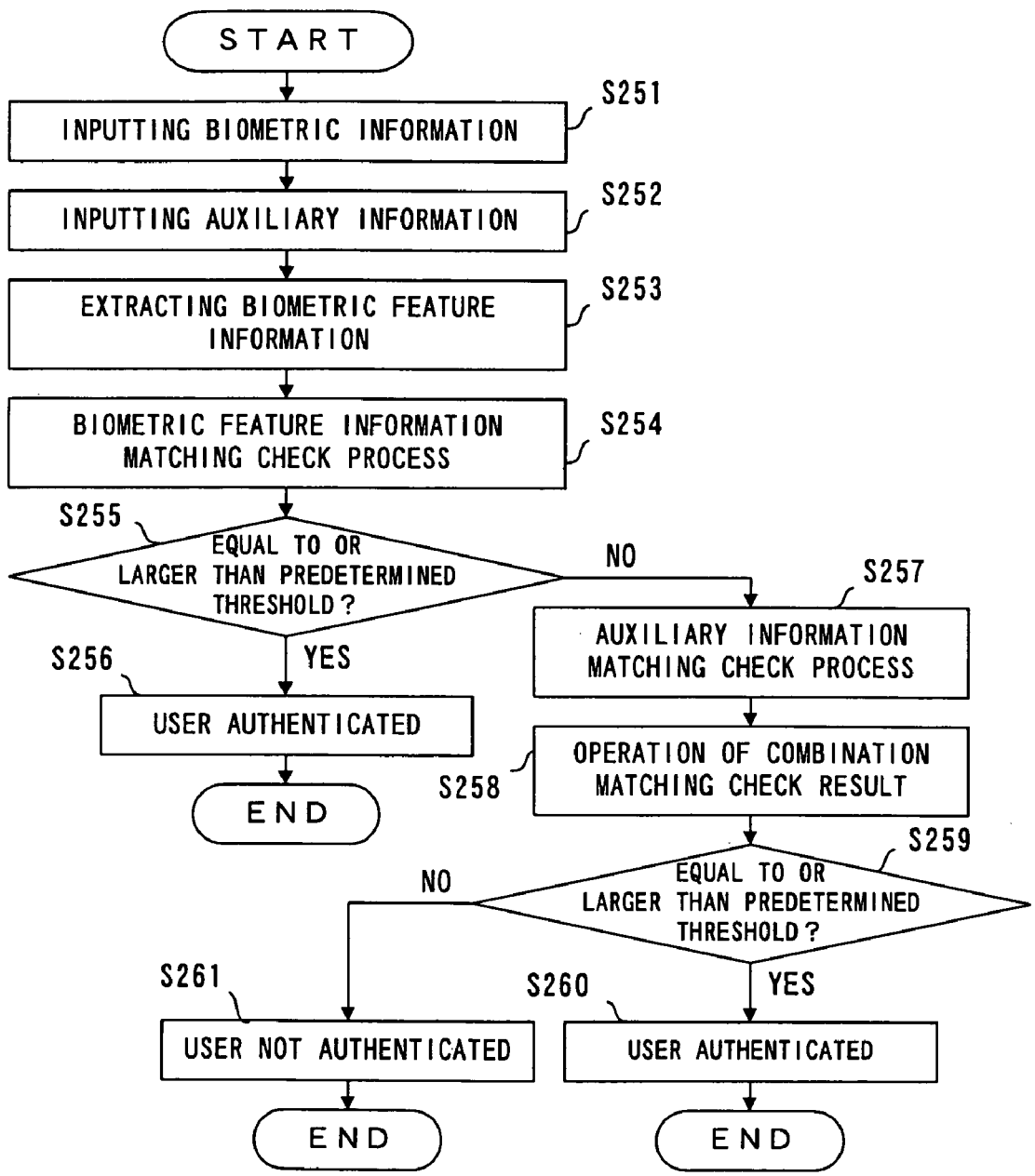
F I G. 3 4

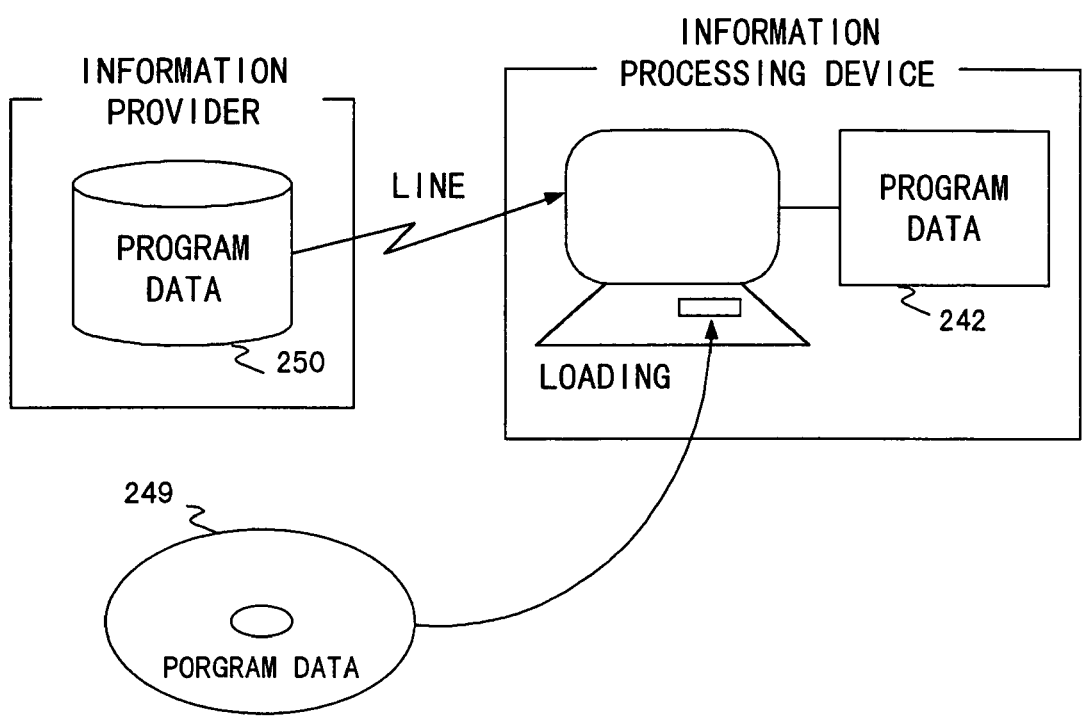
F I G. 36

APPARATUS AND METHOD FOR AUTHENTICATING USER ACCORDING TO BIOMETRIC INFORMATION

BACKGROUND OF THE INVENTION

1. Field of the Invention

The present invention relates to an apparatus and method for authenticating a user according to biometric information such as a fingerprint, voice, and so on.

2. Description of the Related Art

Recently, the infrastructure of communications lines have been desirably organized. Information processing devices such as computers, and so on, are interconnected through communications lines, and users can remotely utilize various services. In money or privacy involved services, it is indispensable to confirm the identity of a use through a password, and so on.

On the other hand, unfortunately, there has been an advantageous environment developed for criminals who try to prepare a program to automatically find a password using their own computers. Therefore, a user is requested to use a long password. But, it is necessarily difficult to manage or memorize a long password. Under the situation, a matching check carried out using biometric information such as a fingerprint, the iris of an eye, a voiceprint, the distribution of the blood vessels in a retina, a signature, a face, the pattern of a vein, and so on, is expected as a method for replacing a password system because biometric information can be more easily maintained or memorized, and can realize correct user authentication.

However, the conventional user authentication technology using biometric information has the following problems.

The reproducibility of biometric information mostly depends on each person, and some users may indicate very low reproducibility of biometric information. It is difficult for those users to use the system as is. On the other hand, the system itself is not appropriately developed to use the user authentication technology on an inappropriate user (who cannot use the technology) using biometric information.

Furthermore, according to the user authentication technology using biometric information, there is the problem that the acceptability of a user and the acceptability of others are traded off, and the acceptability of others should be enhanced to maintain constant acceptability of a user. Therefore, when specific biometric information is adopted, it is necessary to provide a systematic countermeasure for a user who finds difficulty in using the biometric information.

Particularly, in the user authentication in a network, a common network protocol and sequences cannot be properly maintained unless an exception process can be appropriately performed on a difficult user.

Furthermore, since only one type of authentication data is transmitted in a conventional password system, there arises the problem that a difficult switching operation is required for the biometric information.

SUMMARY OF THE INVENTION

The present invention has been developed to solve the above described problems, and aims at providing an authentication apparatus and method appropriate for most of users including those having poor reproducibility in biometric information in the user authentication technology based on biometric information.

According to the first aspect of the present invention, the authentication apparatus includes: a biometric information input unit for inputting biometric information; an extraction unit for extracting biometric feature information from the input biometric information; an estimation unit for estimating the matching precision of the extracted biometric feature information; a request unit for requesting an input of additional authentication information when it is estimated that predetermined matching precision cannot be obtained; an authentication information input unit for inputting the authentication information; a biometric feature information registration unit preliminarily storing registered biometric feature information; an authentication information registration unit preliminarily storing additional registered authentication information; a biometric feature information matching check unit for having a matching check between the extracted biometric feature information and the registered biometric feature information; an authentication information matching check unit for having a matching check between the input authentication information and the above described registered authentication information; and a determination unit for computing the matching precision by combining the matching check result about the biometric feature information with the matching check result about the additional authentication information, and determining based on the computation result whether or not the user is authenticated.

According to the second aspect of the present invention, the authentication apparatus includes: a biometric information input unit for inputting biometric information; an extraction unit for extracting biometric feature information from the input biometric information; an estimation unit for estimating the matching precision of the extracted biometric feature information; a request unit for requesting an input of other biometric information when it is estimated that predetermined matching precision cannot be obtained; a biometric feature information registration unit preliminarily storing plural pieces of registered biometric feature information; a biometric feature information matching check unit for having a matching check between the extracted biometric feature information and the registered biometric feature information; and a determination unit for computing the matching precision by combining the matching check results about the plural pieces of biometric feature information extracted from the plural pieces of input biometric information, and determining based on the computation result whether or not the user is authenticated.

According to the third aspect of the present invention, the authentication apparatus includes: a biometric information input unit for inputting biometric information; an extraction unit for extracting biometric feature information from the input biometric information; an authentication information input unit for inputting additional authentication information; a biometric feature information registration unit preliminarily storing registered biometric feature information; an authentication information registration unit preliminarily storing additional registered authentication information; a biometric feature information matching check unit for having a matching check between the extracted biometric feature information and the registered biometric feature information; an authentication information matching check unit for having a matching check between the input authentication information and the above described registered authentication information when the predetermined matching precision cannot be obtained from the matching check result about the biometric feature information; and a determination unit for computing the matching precision by combining the matching check result about the biometric feature information with the matching check result about the additional authentication information, and determining based on the computation result whether or not the user is authenticated.

According to the fourth aspect of the present invention, a client device in a client-server type authentication system includes: a biometric information input unit for inputting biometric information; an extraction unit for extracting biometric feature information from the input biometric information; an estimation unit for estimating the matching precision of the extracted biometric feature information; a request unit for requesting an input of additional authentication information when it is estimated that predetermined matching precision cannot be obtained; an authentication information input unit for inputting the authentication information; a generation unit for generating matching check data by combining the extracted biometric feature information with the input authentication information; and a communications unit for transmitting the matching check data to the server to have a matching check between the generated matching check data and registered information.

According to the fifth aspect of the present invention, a server device in a client-server type authentication system includes: a communications unit for receiving biometric feature information and additional authentication information from a client; a biometric feature information registration unit preliminarily storing registered biometric feature information; an authentication information registration unit preliminarily storing additional registered authentication information; a biometric feature information matching check unit for having a matching check between the received biometric feature information and the registered biometric feature information; an authentication information matching check unit for having a matching check between the received authentication information and the above described registered authentication information; and a determination unit for computing the matching precision by combining the matching check result about the biometric feature information with the matching check result about the additional authentication information, and determining based on the computation result whether or not the user is authenticated.

According to the sixth aspect of the present invention, an authentication apparatus comprises: a biometric information input unit for inputting biometric information; an extraction unit for extracting biometric feature information from the input biometric information; an estimation unit for estimating the matching precision of the extracted biometric feature information; a request unit for requesting an input of additional authentication information when it is estimated that predetermined matching precision cannot be obtained; an authentication information input unit for inputting the authentication information; a biometric feature information registration unit storing the biometric feature information as registered biometric feature information; an authentication information registration unit storing the authentication information as additional registered authentication information; a biometric feature information matching check unit for having a matching check between the biometric feature information extracted from the biometric information input for authentication and the registered biometric feature information; an authentication information matching check unit for having a matching check between the authentication information input for authentication and the above described registered authentication information; and a determination unit for computing the matching precision by combining the matching check result about the biometric feature information with the matching check result about the additional authentication information, and determining based on the computation result whether or not the user is authenticated.

According to the seventh aspect of the present invention, a client device in a client-server type authentication system includes: a biometric information input unit for inputting biometric information; an extraction unit for extracting biometric feature information from the input biometric information; an estimation unit for estimating the matching precision of the extracted biometric feature information; a request unit for requesting an input of additional authentication information when it is estimated that predetermined matching precision cannot be obtained; an authentication information input unit for inputting the authentication information; a generation unit for generating registration data by combining the extracted biometric feature information with the input authentication information; and a communications unit for transmitting the registration data to the server to register the generated registration data.

According to the eighth aspect of the present invention, a server device in a client-server type authentication system includes: a communications unit for receiving biometric feature information and additional authentication information from a client; a biometric feature information registration unit storing the received biometric feature information as registered biometric feature information; an authentication information registration unit storing the received authentication information as additional registered authentication information; a biometric feature information matching check unit for having a matching check between the biometric feature information received from a client for authentication and the registered biometric feature information; an authentication information matching check unit for having a matching check between the authentication information received from a client for authentication and the above described registered authentication information; and a determination unit for computing the matching precision by combining the matching check result about the biometric feature information with the matching check result about the additional authentication information, and determining based on the computation result whether or not the user is authenticated.

BRIEF DESCRIPTION OF THE DRAWINGS

FIG. 3 shows a set value of a biometric feature information matching score;

FIG. 4 shows a set value of an auxiliary information matching score;

FIG. 7 is a flowchart of the second authenticating process;

FIG. 10 shows the configuration of the fourth authentication apparatus;

FIG. 12 shows the first matching check data;

FIG. 13 is a flowchart of a matching check data generating process;

FIG. 14 shows the configuration of the first client-server system;

FIG. 17 is a flowchart of the second server process;

FIG. 18 shows the fifth authentication apparatus;

FIG. 21 shows the configuration of the sixth authentication apparatus;

FIG. 29 shows the combination of matching check data;

FIG. 30 shows an ID number;

FIG. 31 shows the second matching check data;

FIG. 32 shows the third matching check data;

FIG. 33 shows the configuration of the eighth authentication apparatus;

FIG. 34 is a flowchart of the seventh authenticating process;

FIG. 36 shows a storage medium.

DESCRIPTION OF THE PREFERRED EMBODIMENTS

The preferred embodiments of the present invention are described below by referring to the attached drawings.

Figure 1:
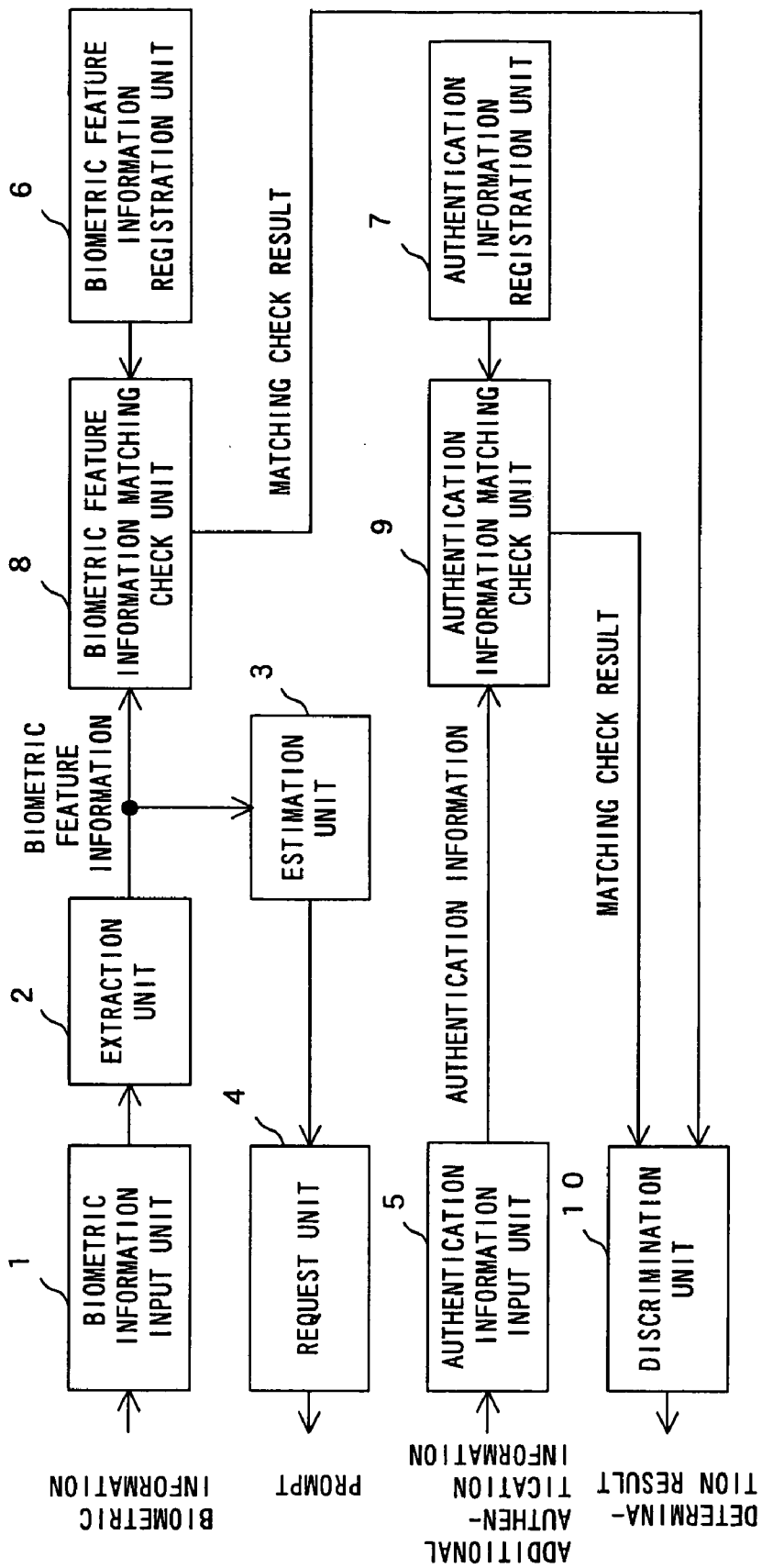
FIG. 1 shows the principle of the authentication apparatus according to the present invention.

FIG. 1 shows the principle of the authentication apparatus of the present invention.

According to the first principle of the present invention, the authentication apparatus comprises a biometric information input unit 1, an extraction unit 2, an estimation unit 3, a request unit 4, an authentication information input unit 5, a biometric feature information registration unit 6, an authentication information registration unit 7, a biometric feature information matching check unit 8, an authentication information matching check unit 9, and a determination unit 10.

The biometric information input unit 1 inputs biometric information. The extraction unit 2 extracts biometric feature information from the input biometric information. The estimation unit 3 estimates the matching precision of the extracted biometric feature information. The request unit 4 requests an input of additional authentication information. The authentication information input unit 5 inputs authentication information. The biometric feature information registration unit 6 preliminarily stores registered biometric feature information. The authentication information registration unit 7 preliminarily stores additional registered authentication information. The biometric feature information matching check unit 8 has a matching check between the extracted biometric feature information and the registered biometric feature information. The authentication information matching check unit 9 has a matching check between the input authentication information and the registered authentication information. The determination unit 10 computes the matching precision by combining the matching check result about the biometric feature information with the matching check result about the additional authentication information, and determines based on the computation result whether or not the user is authenticated.

The extraction unit 2 extracts the biometric feature information indicating the feature of the biometric information about the user. The estimation unit 3 estimates the matching precision from the quality of the biometric feature information. When the estimated matching precision is lower than the predetermined matching precision, the request unit 4 prompts a user to input additional authentication information such as a password. In addition, if the estimated matching precision reaches the predetermined matching precision, then the request unit 4 does not request additional authentication information.

When the authentication information is input, the biometric feature information matching check unit 8 has a matching check on the biometric feature information, and the authentication information matching check unit 9 has a matching check on the authentication information. Then, the determination unit 10 combines the matching check results and computes the matching precision. If the predetermined matching precision can be obtained, the determination unit 10 determines that the user is authenticated, and outputs a determination result.

With the above described authentication apparatus, the matching precision of biometric feature information can be estimated before performing a matching check. Therefore, even a user having poor reproducibility about the biometric feature information can be correctly authenticated by inputting additional authentication information. In addition, a user having good reproducibility about biometric feature information is not required to input additional authentication information.

Furthermore, according to the second principle of the present invention, the authentication apparatus comprises the biometric information input unit 1, the extraction unit 2, the estimation unit 3, the request unit 4, the biometric feature information registration unit 6, the biometric feature information matching check unit 8, and the determination unit 10.

The biometric information input unit 1 inputs biometric information. The extraction unit 2 extracts biometric feature information from the input biometric information. The estimation unit 3 estimates the matching precision of the extracted biometric feature information. The request unit 4 requests an input of other authentication information when it is estimated that predetermined matching precision cannot be obtained.

The biometric feature information registration unit 6 preliminarily stores plural pieces of registered biometric feature information. A biometric feature information matching check unit 8 has a matching check between the extracted biometric feature information and the registered biometric feature information. A determination unit 10 computes the matching precision by combining the matching check results of the plural pieces of biometric feature information extracted from the plural pieces of input biometric information, and determines based on the computation result whether or not the user is authenticated.

When the estimated matching precision is lower than the predetermined matching precision, the request unit 4 prompts the user to input other biometric information having a similar type or a different type as compared with the previously input biometric information. For example, if the previously input biometric information is fingerprint information, then the request unit 4 requests the fingerprint information about another finger, or another type of biometric information such as a fingerprint, the iris of an eye, a voiceprint, the distribution of the blood vessels in a retina, a signature, a face, the pattern of a vein, and so on. Furthermore, if the estimated matching precision reaches the predetermined matching precision, then it requests no other biometric information.

When the biometric information input unit 1 inputs other biometric information, the extraction unit 2 extracts the biometric feature information from the biometric information, and the biometric feature information matching check unit 8 has a matching check on plural pieces of biometric feature information. Then, the determination unit 10 combines the matching check results and computes the matching precision. If the determination unit 10 obtains predetermined matching precision, it authenticates the user, and outputs a determination result.

With the above described authentication apparatus, the matching precision of biometric feature information can be estimated before performing a matching check. Therefore, even a user having poor reproducibility about the biometric feature information can be correctly authenticated by inputting additional authentication information. In addition, a user having good reproducibility about biometric feature information is not required to input additional authentication information.

As described above, one of the important points of the present invention is to estimate the matching precision of biometric feature information before performing a matching check on the biometric feature information, and to request to input additional authentication information such as a password, other biometric information, and so on, based on an estimation result. Another important point of the present invention is to output a determination by combining a matching check result about biometric feature information with a matching check result about additional authentication information.

For example, the biometric information input unit 1, the extraction unit 2, the estimation unit 3, the authentication information input unit 5, the biometric feature information registration unit 6, the authentication information registration unit 7, the biometric feature information matching check unit 8, the authentication information matching check unit 9, and the determination unit 10 shown in FIG. 1 respectively correspond to a biometric information input unit, a biometric feature information extraction unit, a matching precision estimation unit, an auxiliary information input unit, a biometric feature information registration and storage unit, an auxiliary information registration and storage unit, a biometric feature information matching check unit, an auxiliary information matching check unit, and a matching check result determination unit described later. The request unit 4 shown in FIG. 1 corresponds to, for example, an auxiliary information setting unit or a biometric information setting unit described later.

The embodiments of the present invention are described below by referring to the attached drawings.

According to the present invention, the following interface is provided for a user who cannot be easily authenticated by biometric information.

(1) When authentication information is registered, additional authentication data is registered in addition to the biometric feature information representing the feature of biometric information.

(2) When authentication information is registered, the matching precision (user acceptability rate, other person acceptability rate, and so on.) of registered data is determined, and the registration of additional authentication data is prompted.

(3) When authentication information is matching-checked, the matching precision (user acceptability rate, other person acceptability rate, and so on.) of registered data is determined, and the input of additional authentication data is prompted.

(4) A single procedure of communications can be used by processing biometric feature information and additional authentication data as a set of matching check data.

As biometric information, any information based on the biometric characteristic of a user such as a fingerprint, the iris of an eye, a voiceprint, the distribution of the blood vessels in a retina, a signature, a face, the pattern of a vein, and so on. The type of biometric information depends on an applicable matching check method. However, for example, relating to a fingerprint, a fingerprint image, key biometric information extracted from a fingerprint image, and so on, can be input as biometric information. In addition, as additional authentication data, auxiliary information such as a password, and so on, other biometric feature information, and so on, can be used.

By providing the above described interface, even a user having poor reproducibility about biometric feature information can use an authentication system by inputting additional authentication data. In addition, wince biometric feature information and additional authentication data are processed as a set of matching check data, a communications procedure similar to that of a matching check using a password can be used in a client-server type matching check system. Various embodiments of the authentication apparatus/system according to the present invention are sequentially described below.

The first authentication apparatus registers biometric feature information and auxiliary information other than the biometric feature information in a registering process, and requests a user to input his or her biometric information in a matching check process. If it is determined that predetermined matching precision cannot be obtained from the quality of the biometric feature information extracted from the biometric information, then the authentication apparatus requests the user to input auxiliary information.

Confidential information, user information, password, and so on, known to nobody but the user can be used as auxiliary information. In addition, a user stores the auxiliary information in any media such as a magnetic card, an IC (integrated circuit) card, a non-contact card, and so on. The auxiliary information can be input through the media. By using the media, a user is not required to store auxiliary information. In addition, the number of pieces of auxiliary information for use in a matching check process is not limited to one. That is, plural pieces of auxiliary information can be used in combination.

When biometric information has changed or biometric feature information has poor reproducibility, for example, when a voice matching check process is performed on a user who has caught cold, or in a fingerprint matching check process performed on a user having coarse fingers, and so on, a matching check result can be obtained in predetermined matching precision by requesting the user to input auxiliary information. Therefore, the biometric information is not inapplicable, and the user can be easily authenticated.

In addition, the number of requests to input auxiliary information can be a minimum by estimating the matching precision of the biometric feature information when a matching check process is performed. Therefore, a user having good reproducibility about biometric feature information can omit to input auxiliary information.

Figure 2:
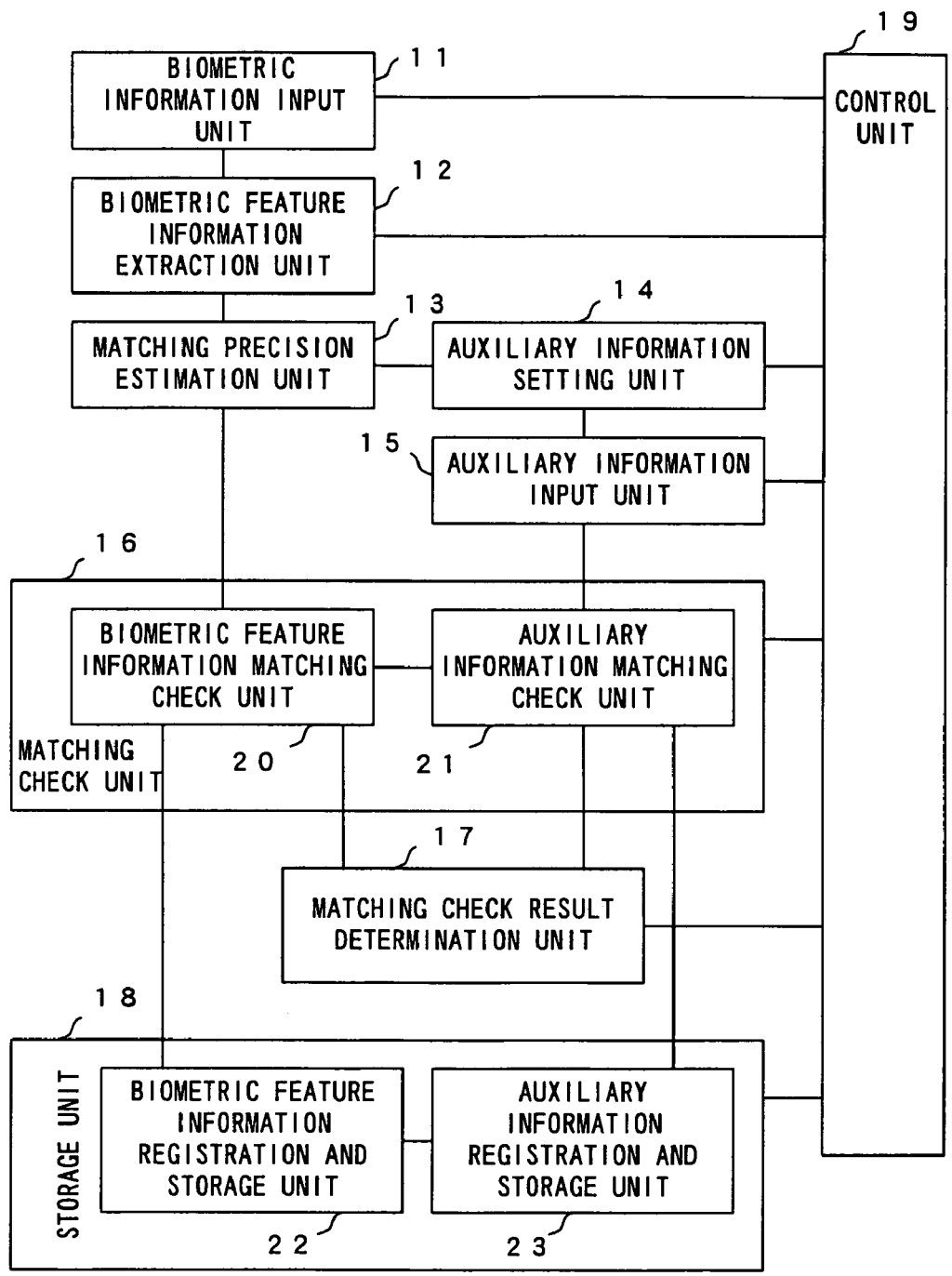
FIG. 2 shows the configuration of the first authentication apparatus.

FIG. 2 shows the configuration of the above described authentication apparatus. The authentication apparatus shown in FIG. 2 comprises a biometric information input unit 11, a biometric feature information extraction unit 12, a matching precision estimation unit 13, a auxiliary information setting unit 14, an auxiliary information input unit 15, a matching check unit 16, a matching check result determination unit 17, a storage unit 18, and a control unit 19. The matching check unit 16 comprises a biometric feature information matching check unit 20 and an auxiliary information matching check unit 21. The storage unit 18 comprises a biometric feature information registration and storage unit 22 and an auxiliary information registration and storage unit 23.

The control unit 19 controls the operations of the entire apparatus. The biometric information input unit 11 inputs biometric information. The biometric feature information extraction unit 12 extracts biometric feature information from the input biometric information. The matching precision estimation unit 13 estimates the matching precision from the quality of the biometric feature information extracted from the biometric information input in a matching check process. If it is determined that predetermined matching precision cannot be obtained, then the auxiliary information setting unit 14 is notified that auxiliary information is required for authentication. In response to the notification, the auxiliary information setting unit 14 prompts the user to input auxiliary information, and the auxiliary information input unit 15 inputs the auxiliary information.

For example, when a fingerprint image is input as biometric information, information such as the intensity of a fingerprint image, the contrast, the number of feature points including error feature points, the number of cracks in a fingerprint ridge line, the contour line length of a fingerprint ridge line, a frequency element, a disorder of a detected ridge line direction information, an area of an input image, and so on, by extracting biometric feature information. Then, according to the information, the matching precision can be determined.

The biometric feature information registration and storage unit 22 registers and stores biometric feature information preliminarily extracted from biometric information. The auxiliary information registration and storage unit 23 preliminarily registers and stores auxiliary information. The biometric feature information matching check unit 20 has a matching check between input biometric feature information and preliminarily registered biometric feature information. The auxiliary information matching check unit 21 has a matching check between input auxiliary information and preliminarily registered auxiliary information.

The matching check result determination unit 17 combines using a predetermined function the matching precision computed from the matching check result (score) about biometric feature information with the matching precision computed from the matching check result about auxiliary information. When the matching precision is equal to or higher than the predetermined matching precision, then the user is authenticated.

Assume that an other persons exclusion rate (non-matching rate) is used, and a product of two other persons acceptability rates is used as a predetermined function. Also assume that the relationship between the matching score of biometric feature information and an other persons acceptability rate is set as shown in FIG. 3, the relationship between the matching score of auxiliary information and the an other persons acceptability rate is set as shown in FIG. 4, and the reference value of the other person acceptability rate required to authenticate a user is set to $1/100000$.

If the score obtained in a matching check of biometric feature information is 4, and the score obtained in a matching check of auxiliary information is 14, then the other person acceptability rates are respectively $1/1000$ and $1/100$ according to FIGS. 3 and 4. At this time, the products of these other person acceptability rates is $1/1000 \times 1/100 = 1/100000$, thereby matching the set reference value. As a result, the user can be authenticated.

If the score obtained in a matching check process about biometric feature information is 4, and the score obtained in a matching check process about auxiliary information is 15, then the other person acceptability rates are respectively $1/1000$ and $1/10$ according to FIGS. 3 and 4. At this time, the products of these other person acceptability rates is $1/1000 \times 1/10 = 1/10000$, thereby exceeding the set reference value of $1/100000$. As a result, there is a strong possibility that the user is not a registered person. As a result, the user cannot be authenticated.

Although an other persons acceptability rate is used as matching precision in the above described example, any other index such as a user acceptability rate, other persons exclusion rate, and so on, can also be used. In addition, a more complicated equation can be used as a predetermined function, and a table indicating the relationship between a matching score and matching precision can be set in higher precision.

Figure 5:
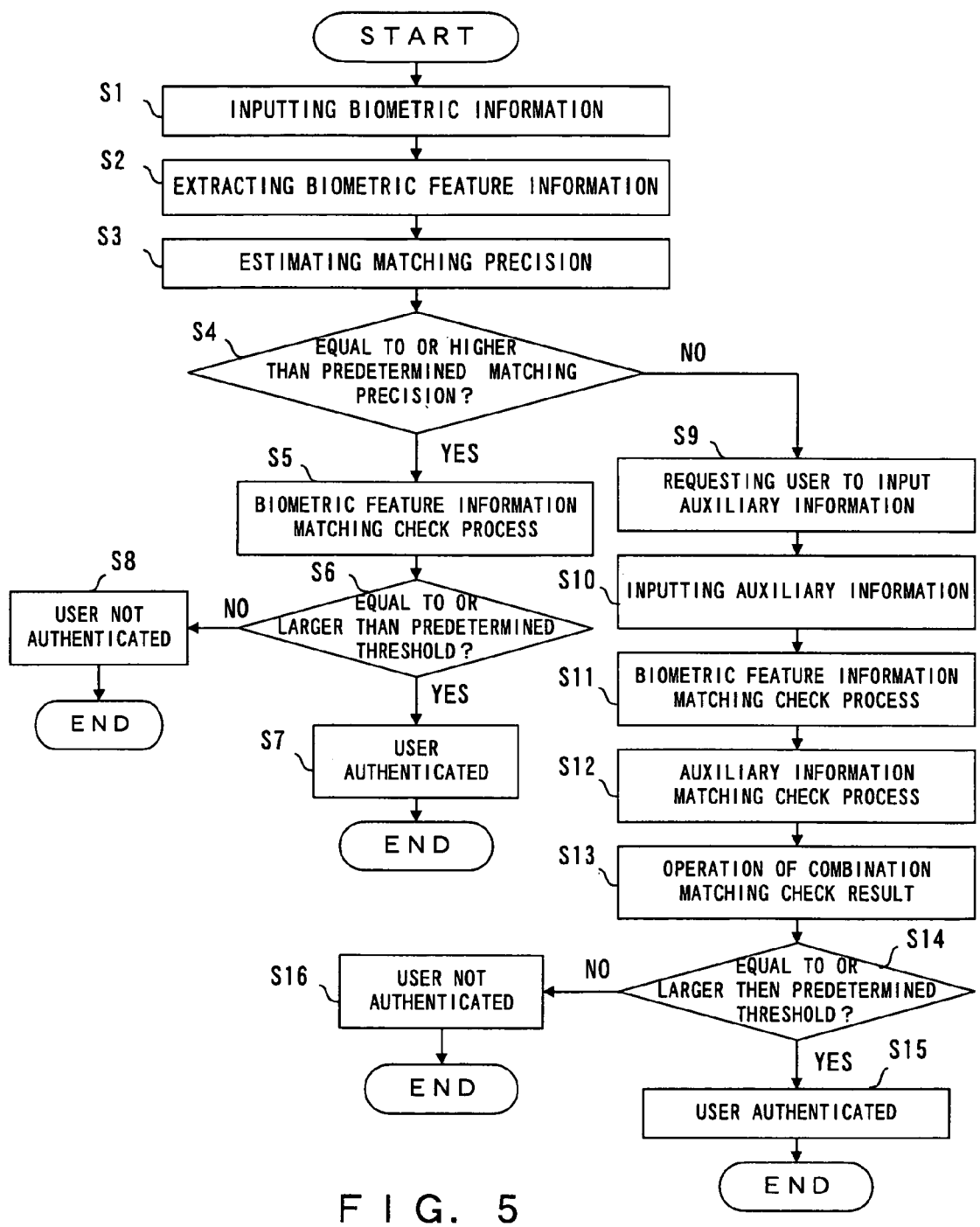
FIG. 5 is a flowchart of the first authenticating process.

FIG. 5 is a flowchart of the authenticating process performed by the authentication apparatus shown in FIG. 2. First, the biometric information input unit 11 inputs user's biometric information (step S1). The biometric feature information extraction unit 12 extracts biometric feature information from the biometric information (step S2). Then, the matching precision estimation unit 13 estimates matching precision from the quality of the biometric feature information (step S3), and compares the estimated matching precision with predetermined matching precision (step S4).

If the estimated matching precision is equal to or higher than the predetermined matching precision, then the biometric feature information matching check unit 20 has a matching check between the extracted biometric feature information and the biometric feature information registered in the biometric feature information registration and storage unit 22 (step S5), and compares the matching check result with a predetermined matching threshold (step S6). Then, if the matching check result is equal to or larger than the threshold, the user is authenticated (step S7). If the matching check result is smaller than the threshold, then the user is not authenticated (step S8), thereby terminating the process.

If the estimated matching precision is lower than the predetermined matching precision in step S4, then the auxiliary information setting unit 14 prompts the user to input auxiliary information (step S9). The auxiliary information input unit 15 inputs auxiliary information (step S10).

Then, the biometric feature information matching check unit 20 has a matching check between the extracted biometric feature information and the biometric feature information registered in the biometric feature information registration and storage unit 22 (step S11). The auxiliary information matching check unit 21 has a matching check between the input auxiliary information and the auxiliary information registered in the auxiliary information registration and storage unit 23 (step S12).

Next, the matching check result determination unit 17 performs a combining operation using the matching check result about biometric feature information and the matching check result about auxiliary information (step S13), and compares the obtained operation value with a predetermined matching threshold (step S14). If the operation value is equal to or larger than the threshold, then the user is authenticated (step S15). If the operation value is smaller than the threshold, then the user is not authenticated (step S16), thereby terminating the process.

Then, the second authentication apparatus registers biometric feature information and auxiliary information other than the biometric feature information in a registering process, requests a user to input his or her biometric information in a matching check process, and determines the quality of the biometric feature information. If the second authentication apparatus determines that predetermined matching precision cannot be obtained, it requests the user to input his or her password. When the matching precision of the biometric feature information is low, the matching precision of the password is combined with the biometric feature information to attain the predetermined matching precision as in the case where auxiliary information is used.

At this time, the number of digits of the input password is variable. The second authentication apparatus prompts the user to input his or her password of the necessary number of digits to attain the predetermined matching precision by combining the password with the matching precision of biometric feature information. For example, if the number of digits is designed to be set based on predetermined matching precision, then the number of digits can be set smaller when the matching precision is not so low. In this case, an input password is checked for matching with a part of a predetermined password. Thus, the user only has to input the smallest possible number of digits of his or her password, thereby maintaining the convenience of biometric feature information.

Figure 6:
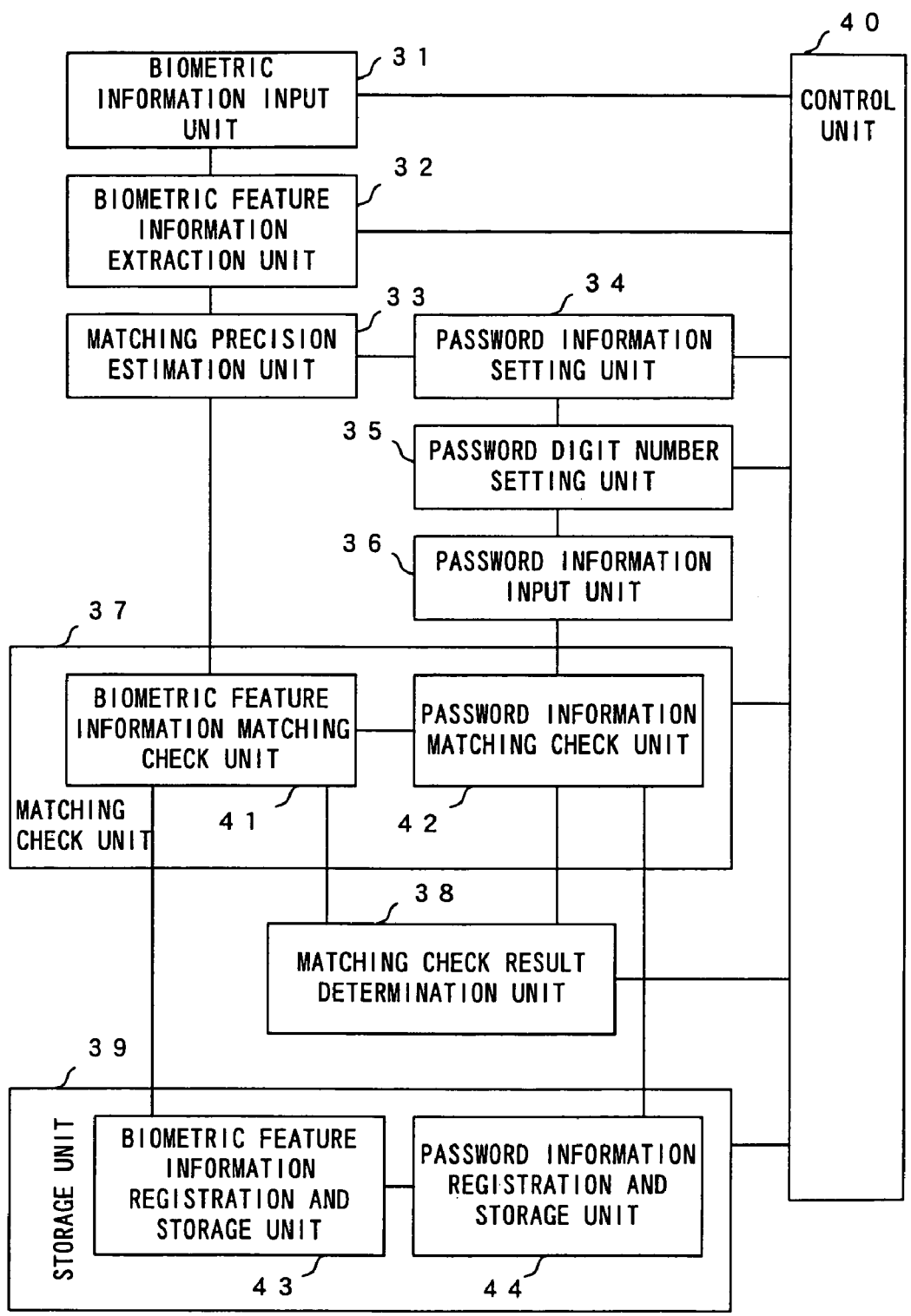
FIG. 6 shows the configuration of the second authentication apparatus.

FIG. 6 shows the configuration of the above described authentication apparatus. The authentication apparatus shown in FIG. 6 comprises a biometric information input unit 31, a biometric feature information extraction unit 32, a matching precision estimation unit 33, a password information setting unit 34, a password digit number setting unit 35, a password information input unit 36, a matching check unit 37, a matching check result determination unit 38, a storage unit 39, and a control unit 40. The matching check unit 37 comprises a biometric feature information matching check unit 41 and a password information matching check unit 42. The storage unit 39 comprises a biometric feature information registration and storage unit 43 and a password information registration and storage unit 44.

The operations of the biometric information input unit 31, the biometric feature information extraction unit 32, the matching precision estimation unit 33, the biometric feature information matching check unit 41, the biometric feature information registration and storage unit 43, and the control unit 40 are the same as those in the authentication apparatus shown in FIG. 2.

If the matching precision estimation unit 33 determines that predetermined matching precision cannot be obtained from biometric feature information, then it notifies the password information setting unit 34 of the number of digits of the password required to supplement the matching precision. In response to the notification, the password information setting unit 34 inputs the number of digits to the password digit number setting unit 35. The password digit number setting unit 35 sets the number of digits, and prompts the user to input a password having the number of digits equal to or larger than the set number. The password information input unit 36 inputs password information.

The password information registration and storage unit 44 preliminarily registers and stores password information. The password information matching check unit 42 has a matching check between the input password information and the preliminarily registered password information.

The matching check result determination unit 38 combines using a predetermined function the matching precision computed from the matching check result about biometric feature information with the matching precision computed from the matching check result about password information. When the obtained matching precision is equal to or higher than predetermined matching precision, then the user is authenticated.

For example, assume that an other persons exclusion rate (non-matching rate) is used, and a product of two other persons acceptability rates is used as a predetermined function. Also assume that the reference value of the other person acceptability rate required to authenticate a user is set to $\frac{1}{100000}$, that it is estimated that only the matching precision of $\frac{1}{1000}$ can be obtained according to biometric feature information, and that a 3-digit password is prompted based on the margin.

At this time, if the other person acceptability rate of $\frac{1}{10000}$ can be obtained after the actual matching check on the biometric feature information, then the other person acceptability rate based on a password can be $\frac{1}{10}$ or lower according to the combining operation. Therefore, all of the input digits do not have to match the registered password, but one or two digits matching the registered password can authenticate the user.

FIG. 7 is a flowchart of the authenticating process performed by the authentication apparatus shown in FIG. 6. The processes from steps S21 through S28 shown in FIG. 7 are the same as the processes from steps S1 thorough S8 shown in FIG. 5.

In step S24, if the estimated matching precision is lower than predetermined matching precision, then the password digit number setting unit 35 sets the necessary number of digits of a password (step S29), and requests the user to input password information (step S30). The password information input unit 36 inputs password information (step S31). Then, the biometric feature information matching check unit 41 has a matching check between the extracted biometric feature information and the biometric feature information registered in the biometric feature information registration and storage unit 43 (step S32). The password information matching check unit 42 has a matching check between the input password information and the password information registered in the password information registration and storage unit 44 (step S33).

Then, the matching check result determination unit 38 performs a combining operation using the matching check result about the biometric feature information and the matching check result about the password information (step S34), and compares the obtained operation value with a predetermined matching threshold (step S35). If the operation value is equal to or larger than the threshold, then the user is authenticated (step S36). If the operation value is smaller than the threshold, then the user is not authenticated (step S37), thereby terminating the process.

The third authentication apparatus registers plural pieces of biometric feature information, and performs an authenticating process according to the information. For example, when biometric information relates to a fingerprint, the fingerprints of the left and right forefingers are used. When biometric information relates to the iris, the information about the irises of the right and left eyes is used. When biometric information relates to voice, a plurality of different phrases or vowels are used. When biometric information relates to a signature, plurality of signatures are used.

The third authentication apparatus requests the user to input biometric information when a matching check is carried out to determine the quality of biometric feature information. If it determines that predetermined matching precision cannot be obtained, then it requests the user to input biometric information corresponding to other registered biometric feature information. Since plural pieces of biometric information are used, it is not necessary to store a password, and so on, and only biometric information can correctly authenticate the user.

Figure 8:
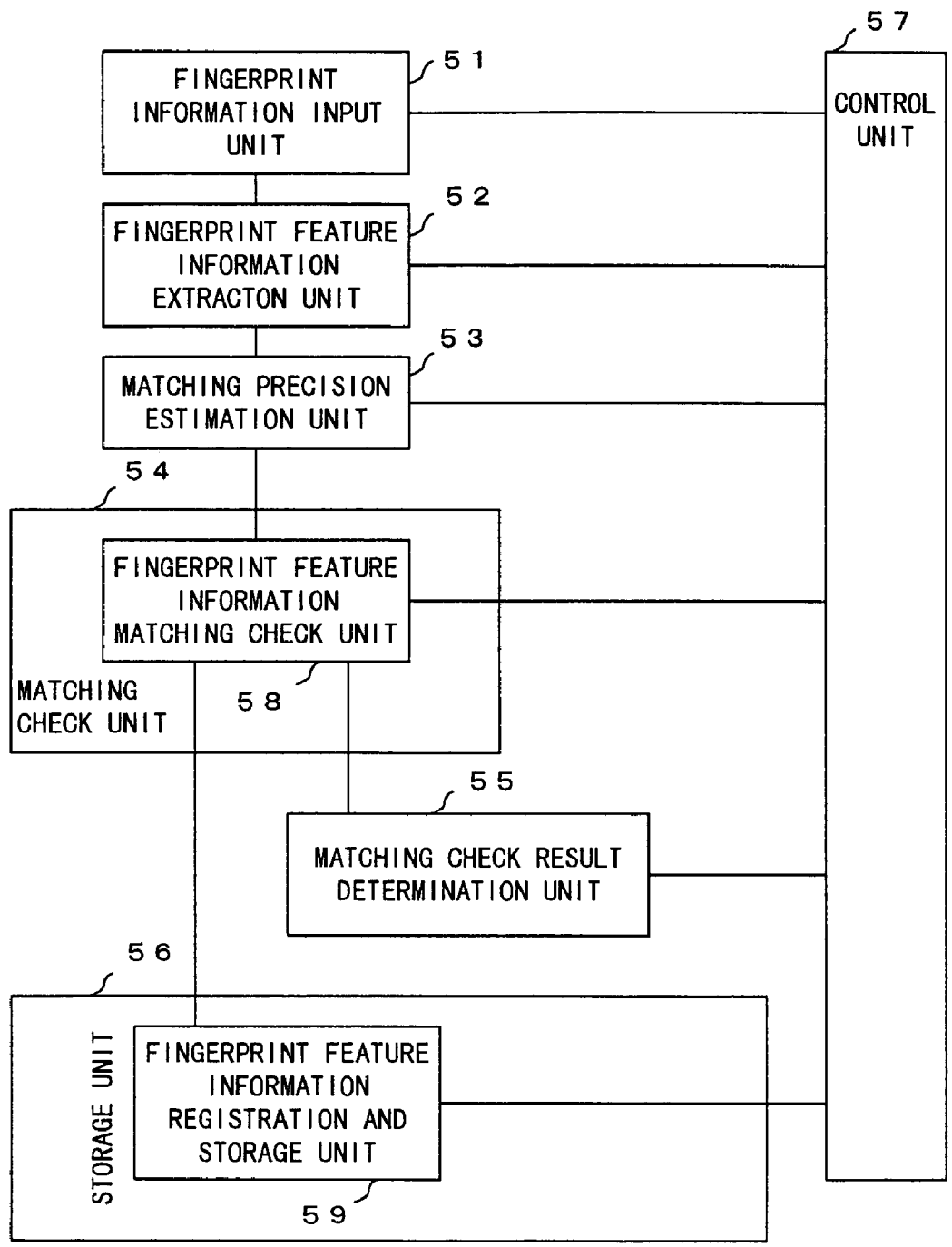
FIG. 8 shows the configuration of the third authentication apparatus.

FIG. 8 shows the configuration of the authentication apparatus when a fingerprint is used as biometric information. The authentication apparatus shown in FIG. 8 comprises a fingerprint information input unit 51, a fingerprint feature information extraction unit 52, a matching precision estimation unit 53, a matching check unit 54, a matching check result determination unit 55, a storage unit 56, and a control unit 57. The matching check unit 54 comprises a fingerprint feature information matching check unit 58. The storage unit 56 comprises a fingerprint feature information registration and storage unit 59.

The control unit 57 controls the operations of the entire apparatus. The fingerprint information input unit 51 inputs a fingerprint image. The biometric feature information extraction unit 12 extracts fingerprint feature information from the input fingerprint image. The matching precision estimation unit 13 estimates the matching precision from the quality of the fingerprint feature information extracted from the fingerprint image input in the matching check process. If the matching precision estimation unit 13 determines that predetermined matching precision cannot be obtained, it notifies the control unit 57 that the fingerprint image of another finger is also required. In response to the notification, the control unit 57 prompts the user to input the fingerprint image of another registered finger, and the fingerprint information input unit 51 inputs the fingerprint image.

For example, if it is estimated that the matching precision is not sufficient when the first fingerprint image of the right forefinger is input, then the user is requested to input the fingerprint image of the right middle finger.

The fingerprint feature information registration and storage unit 59 preliminarily registers and stores the fingerprint feature information extracted from the fingerprint images of a plurality of fingers. The fingerprint feature information matching check unit 58 has a matching check between the input fingerprint feature information about a plurality of fingers and the corresponding fingerprint feature information in the fingerprint feature information registration and storage unit 59.

The matching check result determination unit 55 combines using a predetermined function the matching precision computed from the matching check results about the fingerprint feature information of each finger. If the matching precision is equal to or higher than predetermined precision, then the user is authenticated.

Thus, although it is estimated that the matching precision is not sufficient according to the fingerprint feature information of one finger, predetermined matching precision can be obtained by combining the fingerprint feature information about a plurality of fingers.

Figure 9:
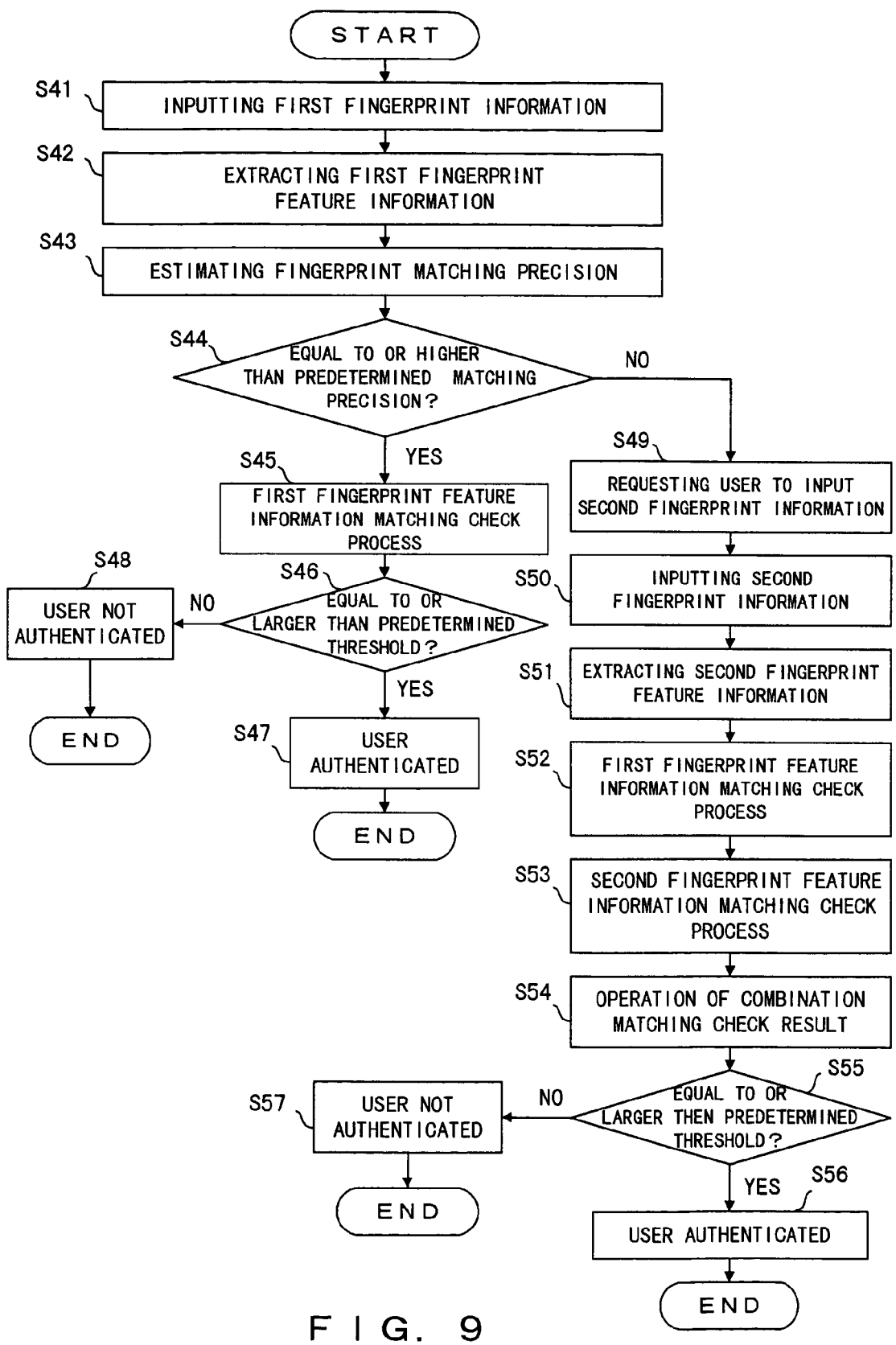
FIG. 9 is a flowchart of the third authenticating process.

FIG. 9 is a flowchart of the authenticating process performed by the authentication apparatus shown in FIG. 8. First, the fingerprint information input unit 51 inputs the fingerprint information about the first finger of the user (step S41). The fingerprint feature information extraction unit 52 extracts the first fingerprint feature information from the first fingerprint information (the fingerprint information about the first finger) (step S42). Then, the matching precision estimation unit 53 estimates the matching precision from the quality of the fingerprint feature information (step S43), and compares the estimated matching precision with predetermined matching precision (step S44).

If the estimated matching precision is equal to or higher than the predetermined matching precision, then the fingerprint feature information matching check unit 58 has a matching check between the extracted fingerprint feature information and the fingerprint feature information registered in the fingerprint feature information registration and storage unit 59 (step S45), and compares the matching check result with a predetermined matching threshold (step S46). If the matching check result is equal to or larger than the threshold, then the user is authenticated (step S47). If the matching check result is smaller than the threshold, then the user is not authenticated (step S48), thereby terminating the process.

If the estimated matching precision is lower than the predetermined matching precision in step S44, then the control unit 57 requests the user to input the fingerprint information about the second finger (step S49). Then, the fingerprint information input unit 51 inputs the second fingerprint information (step S50), and the fingerprint feature information extraction unit 52 extracts the second fingerprint feature information from the second fingerprint information (step S51).

Then, the matching check unit 54 has a matching check between the first fingerprint feature information and the corresponding fingerprint feature information registered in the biometric feature information registration and storage unit 22 (step S52), and has a matching check between the second fingerprint feature information and the corresponding fingerprint feature information registered in the biometric feature information registration and storage unit 22 (step S53).

Next, the matching check result determination unit 55 performs a combining operation using two matching check results about the fingerprint feature information (step S54), and compares the obtained operation value with a predetermined matching threshold (step S55). If the operation value is equal to or larger than the threshold, then the user is authenticated (step S56). If the operation value is smaller than the threshold, then the user is not authenticated (step S57), thereby terminating the process.

The above embodiment is described based on fingerprints, but the fingerprints can be replaced with other biometric information such as an irises (right and left eyes), voiceprints (different phrases or vowels), the distributions of the blood vessels in a retina (right and left eyes), a signature (different signatures), a face image, DNA, and so on. In addition, the biometric information about three or more objects such as a forefinger, a middle finger, and a thumb can be used.

Then, the fourth authentication apparatus registers plural types of biometric feature information processed in different matching check methods, and an authenticating process is performed by combining a plurality of matching check methods. For example, combinations of a fingerprint and voice, a fingerprint and irises, a fingerprint and a signature, a fingerprint and a face image, and so on, are used.

The fourth authentication apparatus requests the user to input biometric information in a matching check process, and determines the quality of biometric feature information.

If it is determined that predetermined matching precision cannot be obtained, then the user is requested to input biometric information corresponding to another type of registered biometric feature information. Since plural types of matching check methods are used, it is not necessary to store a password, and so on, and the user can be authenticated only by biometric information.

FIG. 10 shows the configuration of the above described authentication apparatus. The authentication apparatus shown in FIG. 10 comprises biometric information input units 61 and 65, biometric feature information extraction units 62 and 66, a matching precision estimation unit 63, a biometric information setting unit 64, a matching check unit 67, a matching check result determination unit 68, a storage unit 69, and a control unit 70. The matching check unit 67 comprises biometric feature information matching check units 71 and 72. The storage unit 69 comprises biometric feature information registration and storage units 73 and 74.

The operations of the biometric information input unit 61, the biometric feature information extraction unit 62, the matching precision estimation unit 63, and the control unit 70 are the same as those of the authentication apparatus shown in FIG. 2.

When the matching precision estimation unit 63 determines that predetermined matching precision cannot be obtained from biometric feature information, it notifies the biometric information setting unit 64 that another matching check method is also required. In response to the notification, the biometric information setting unit 64 sets another type of biometric information, and prompts the user to input the biometric information. For example, if it is estimated that matching precision is not sufficient when the first fingerprint information is input, then the user is prompted to input voice information.

The biometric information input unit 65 input biometric information. The biometric feature information extraction unit 66 extracts biometric feature information from the input biometric information.

The biometric feature information registration and storage units 73 and 74 preliminarily register and store different types of biometric feature information. The biometric feature information matching check unit 71 has a matching check between the biometric feature information extracted by the biometric feature information extraction unit 62 and the biometric feature information in the biometric feature information registration and storage unit 73. The biometric feature information matching check unit 72 has a matching check between the biometric feature information extracted by the biometric feature information extraction unit 66 and the biometric feature information in the biometric feature information registration and storage unit 74. Generally, the biometric feature information matching check units 71 and 72 have a matching check on the biometric feature information in respective matching check methods.

The matching check result determination unit 68 combines the matching precision computed from the matching check results obtained by the biometric feature information matching check units 71 and 72. When the matching precision is equal to or higher than predetermined precision, the user is authenticated.

Figure 11:
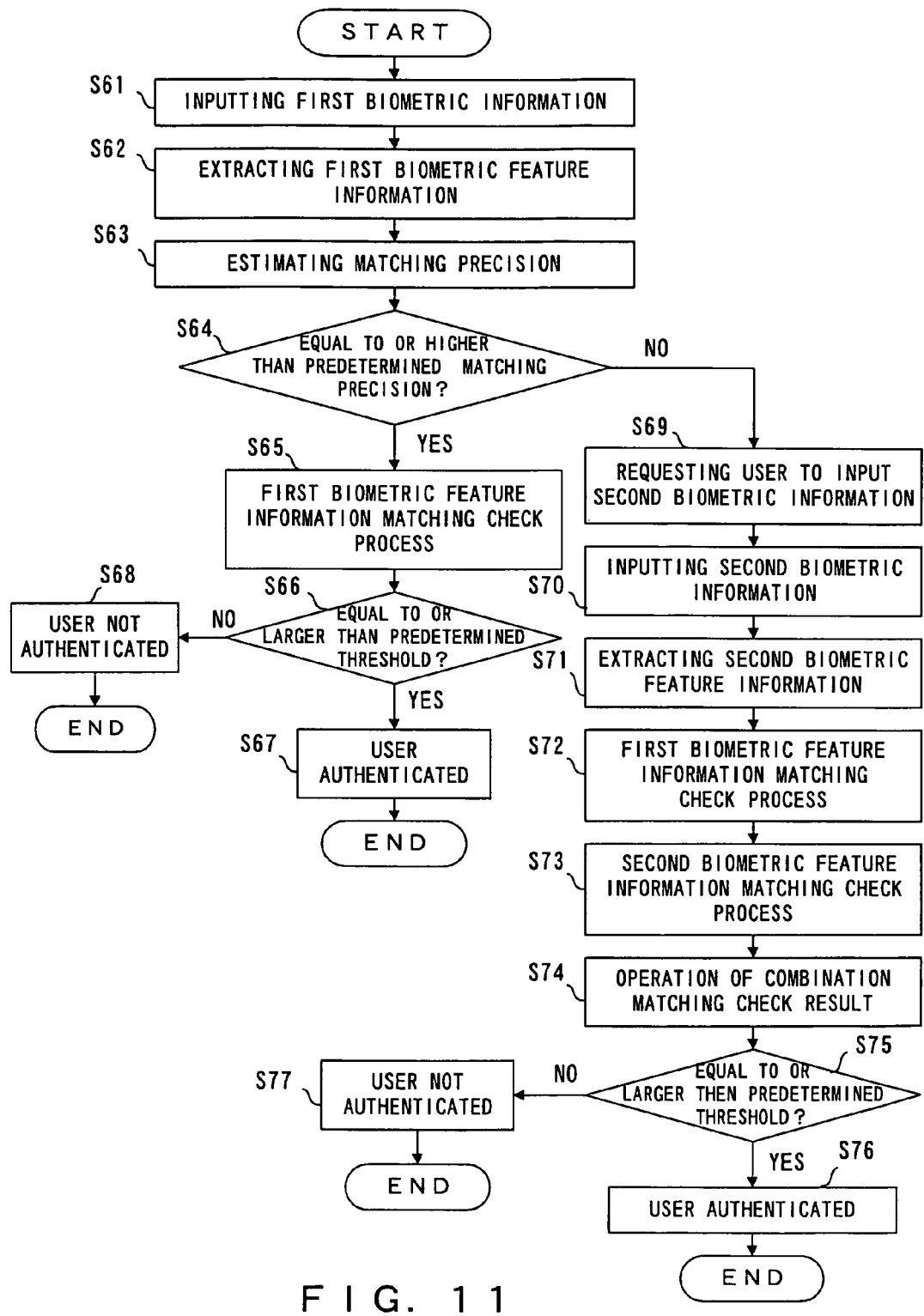
FIG. 11 is a flowchart of the fourth authenticating process.

FIG. 11 is a flowchart of the authenticating process performed by the authentication apparatus shown in FIG. 10. The process relating to the first biometric information in steps S61 through S68 shown in FIG. 11 are the same as those in steps S1 through S8 shown in FIG. 5.

If the estimated matching precision is lower than predetermined matching precision in step S64, the biometric information setting unit 64 requests the user to input the second biometric information of a type different from the type of the first biometric information (step S69). Then, the biometric information input unit 65 inputs the second biometric information (step S70), and the biometric feature information extraction unit 66 extracts the second biometric feature information from the second biometric information (step S71).

Next, the biometric feature information matching check unit 71 has a matching check between the first biometric feature information and the biometric feature information registered in the biometric feature information registration and storage unit 73 (step S72). The biometric feature information matching check unit 72 has a matching check between the second biometric feature information and the biometric feature information registered in the biometric feature information registration and storage unit 74 (step S73).

Then, the matching check result determination unit 68 performs a combining operation using the matching check results about two types of biometric feature information (step S74), and compares the obtained operation value with a predetermined matching threshold (step S75). If the operation value is equal to or larger than the threshold, then the user is authenticated (step S76). If the operation value is smaller than the threshold, then the user is not authenticated (step S77), thereby terminating the process.

In this example, any combination of different types of biometric information such as a fingerprint, irises, a voiceprint, the distribution of the blood vessels in a retina, a signature, and so on, can also be similarly used as the first and the second biometric information.

In the authentication apparatus shown in FIGS. 2 and 6, the biometric feature information and the auxiliary information such as a password, and so on, are input to the matching check unit as different matching check data. However, these pieces of data can be collectively transmitted to the matching check unit as a set of matching check data. The matching check path can be simple by collectively processing the matching check data in the apparatus. That is, one type of matching check data can be transferred only once from the biometric feature information extraction unit and the auxiliary information input unit to the matching check unit. In addition, it is not necessary to repeating the phase of inputting a number of types of matching check data.

Assume that a matching check data generation unit is provided in an authentication apparatus. If it is determined based on the quality of biometric feature information that predetermined matching precision cannot be obtained, then the matching check data generation unit combines the biometric feature information with auxiliary information, generates a set of matching check data as shown in FIG. 12, and transmits the data to a matching check unit.

FIG. 13 is a flowchart of the matching check data generating process performed by the authentication apparatus. The authentication apparatus first inputs biometric information (step S81), extracts biometric feature information from biometric information (step S82), and inputs auxiliary information (step S83). Then, an auxiliary information data process is performed (step S84), and matching check data is generated by combining biometric feature information with auxiliary information (step S85), thereby terminating the process.

Similarly, the authentication apparatus shown in FIG. 8 is designed to generate a set of matching check data by combining plural pieces of fingerprint feature information about a plurality of fingers. To be more common, a set of matching check data can be generated by combining plural pieces of biometric feature information corresponding to the same matching check method. In addition, in the authentication apparatus shown in FIG. 10, a set of matching check data can be generated by combining plural types of biometric feature information processed in different matching check methods. Using the matching check data, a simple matching check path can be established.

Thus, processing one type of matching check data can be realized as in a conventional method when communicating with an existing system by transmitting plural pieces of matching check data as one set of matching check data, thereby simplifying the installation of the apparatus. On the other hand, in the method of requesting subsequent matching check data when a matching check outputs a non-matching result about a set of matching check data, it is estimated that the communications cost doubles.

Described below is a client-server type authentication system for transmitting biometric feature information from a client to a server, and having a matching check in the server. In this system, the matching precision of biometric feature information is estimated on the client side, and a user is requested to input auxiliary information if necessary. Then, matching check data is generated by combining biometric feature information with auxiliary information, and is transmitted to the server.

According to the system, the time of transmitting matching check data to a server can be only one. In addition, since the times of transmitting matching check data are equal between the case where auxiliary information is required and the case where no such information is required, thereby generating a simple communications procedure.

FIG. 14 shows the configuration of the above described authentication system. The authentication system shown in FIG. 14 comprises a client 81, a server 82, and a network system 83 for connecting them. The network system 83 includes any network such as a LAN (local area network), a WAN (wide area network), and so on.

The client 81 comprises a biometric information input unit 91, a biometric feature information extraction unit 92, a matching precision estimation unit 93, an auxiliary information setting unit 94, an auxiliary information input unit 95, a matching check data generation unit 96, a communications unit 97, and a control unit 98.

The server 82 comprises a communications unit 101, a matching check unit 102, a matching check result determination unit 103, a storage unit 104, and a control unit 105. The matching check unit 102 comprises a biometric feature information matching check unit 106, a matching check data separation unit 107, and an auxiliary information matching check unit 108. The storage unit 104 comprises a biometric feature information registration and storage unit 109 and an auxiliary information registration and storage unit 110.

The operations of the biometric information input unit 91, the biometric feature information extraction unit 92, the matching precision estimation unit 93, the auxiliary information setting unit 94, the auxiliary information input unit 95, the matching check result determination unit 103, the biometric feature information matching check unit 106, the auxiliary information matching check unit 108, the biometric feature information registration and storage unit 109, and the auxiliary information registration and storage unit 110 are the same as those of the authentication apparatus shown in FIG. 2.

The control unit 98 controls the operations of the entire client 81. The control unit 105 controls the operations of the entire server 82. The matching check data generation unit 96 of the client 81 generates matching check data by combining biometric feature information with auxiliary information. The communications unit 97 transmits the generated matching check data to the server 82. The communications unit 101 of the server 82 receives the matching check data. The matching check data separation unit 107 separates the received matching check data into biometric feature information and auxiliary information, inputs the biometric feature information to the biometric feature information matching check unit 106, and inputs the auxiliary information to the auxiliary information matching check unit 108.

Figure 15:
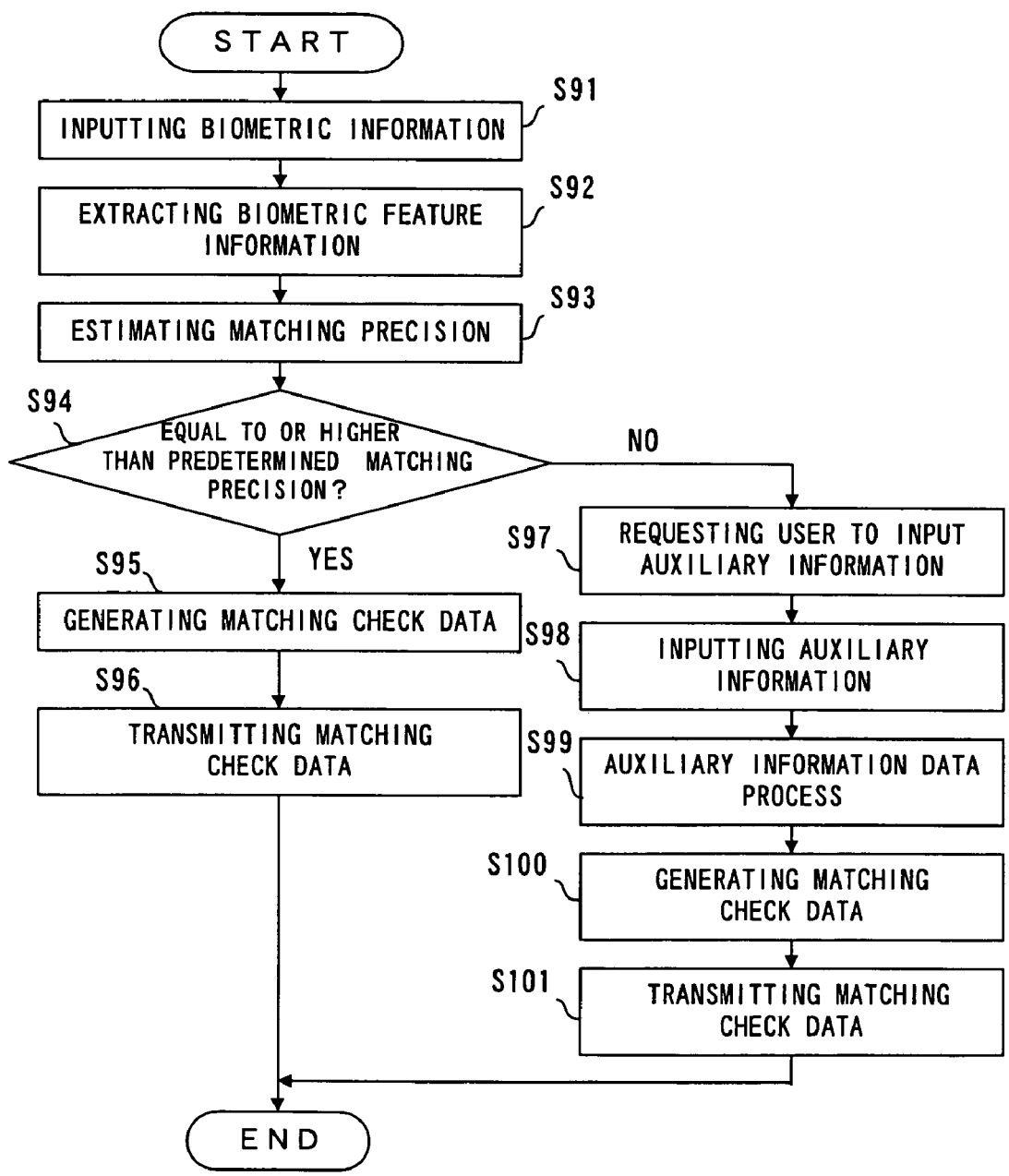
FIG. 15 is a flowchart of the first client process.

FIG. 15 is a flowchart of the process performed by the client 81 shown in FIG. 14. The processes in steps S91 through S94 shown in FIG. 15 are the same as those in steps S1 through S4 shown in FIG. 5. The processes in steps S97 and S98 shown in FIG. 15 are the same as those in steps S9 and S10 shown in FIG. 5.

In step S94, if the estimated matching precision is equal to or higher than predetermined matching precision, then the matching check data generation unit 96 generates matching check data containing only biometric feature information (step S95), and the communications unit 97 transmits the matching check data to the server 82 (step S96), thereby terminating the process.

If auxiliary information is input in step S98, the matching check data generation unit 96 performs an auxiliary information data process (step S99), and generates matching check data by combining the biometric feature information with the auxiliary information (step S100). Then, the communications unit 97 transmits the matching check data to the server 82 (step S101), thereby terminating the process.

Figure 16:
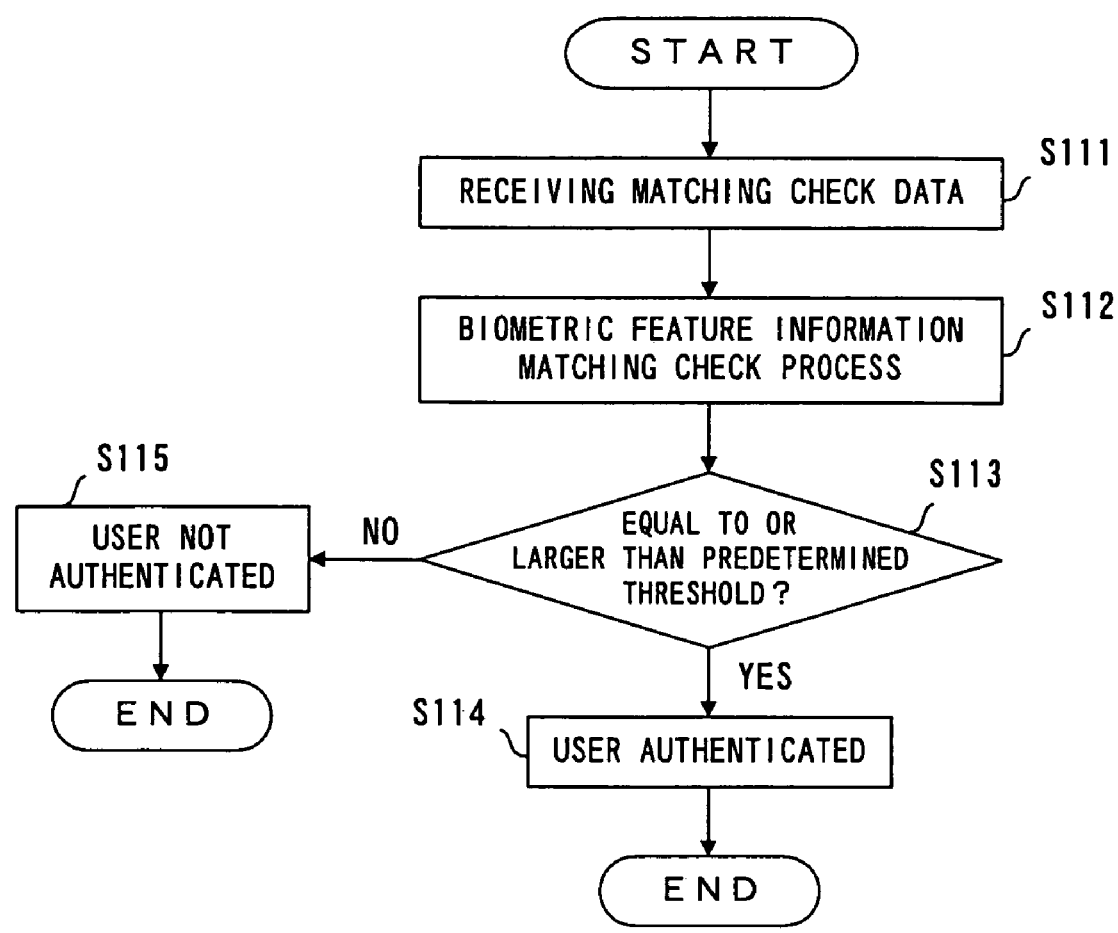
FIG. 16 is the first server process.

FIG. 16 is a flowchart of the process performed when the server 82 shown in FIG. 14 receives matching check data containing only biometric feature information. First, the communications unit 101 receives matching check data from the client 81 (step S111). The processes in the subsequent steps S112 through S115 are the same as those in steps S5 through S8 shown in FIG. 5.

FIG. 17 is a flowchart of the process performed when the server 82 shown in FIG. 14 receives matching check data containing biometric feature information and auxiliary information. First, the communications unit 101 receives matching check data from the client 81 (step S121), and the matching check data separation unit 107 separates the matching check data into biometric feature information and auxiliary information (step S122). The subsequent processes in steps S123 through S128 are the same as those in steps in S11 through S16 shown in FIG. 5.

Similarly, matching check data is generated by combining plural pieces of biometric feature information corresponding to the same matching check method, and can be transmitted from a client to a server. In addition, matching check data can also be generated by combining plural pieces of biometric feature information processed in different matching check methods, and can be transmitted from a client to a server.

Thus, when plural pieces of matching check data are processed, the data can be processed in a simple communications procedure by transferring the data as a set of data from a client to a server. The transferred matching check data is analyzed into the original matching check data in the server, and transmitted to a matching check unit corresponding to each matching check method. On the other hand, if a method of requesting subsequent matching check data is used when a matching check outputs a non-matching result, the communications cost is estimated to double.

The fifth authentication apparatus estimates matching precision from biometric feature information in a registering process, and requests to register auxiliary information when it is determined that predetermined matching precision cannot be obtained. Then, in a matching check process, it generally determines the matching check result between biometric feature information and auxiliary information to authenticate the user. The predetermined matching precision can be attained by combining the matching precision of the biometric feature information with the matching precision of the auxiliary information, thereby minimizing the possibility of a non-matching result.

FIG. 18 shows the configuration of the above described authentication apparatus. The authentication apparatus shown in FIG. 18 comprises a biometric information input unit 111, a biometric feature information extraction unit 112, a matching precision estimation unit 113, an auxiliary information setting unit 114, an auxiliary information input unit 115, a storage unit 116, a matching check unit 117, a matching check result determination unit 118, and a control unit 119. The storage unit 116 comprises a biometric feature information registration and storage unit 120 and an auxiliary information registration and storage unit 121. The matching check unit 117 comprises a biometric feature information matching check unit 122 and an auxiliary information matching check unit 123.

The operations of the biometric information input unit 111, the biometric feature information extraction unit 112, the biometric feature information registration and storage unit 120, the auxiliary information registration and storage unit 121, the biometric feature information matching check unit 122, the auxiliary information matching check unit 123, the matching check result determination unit 118, and the control unit 119 are the same as those of the authentication apparatus shown in FIG. 2.

The matching precision estimation unit 113 estimates the matching precision from the quality of the biometric feature information extracted from the biometric information input in a registering process. If it is determined that predetermined matching precision cannot be obtained, then the matching precision estimation unit 113 notifies the auxiliary information setting unit 114 that auxiliary information is required for authentication. In response to the notification, the auxiliary information setting unit 114 prompts the user to register auxiliary information, and the auxiliary information input unit 115 inputs auxiliary information.

For example, although there are few fingerprint feature information registered, predetermined matching precision can be obtained in a matching check process by requesting to register a password as auxiliary information. Therefore, a user whose acceptable fingerprint feature information is not registered can be authenticated.

Figure 19:
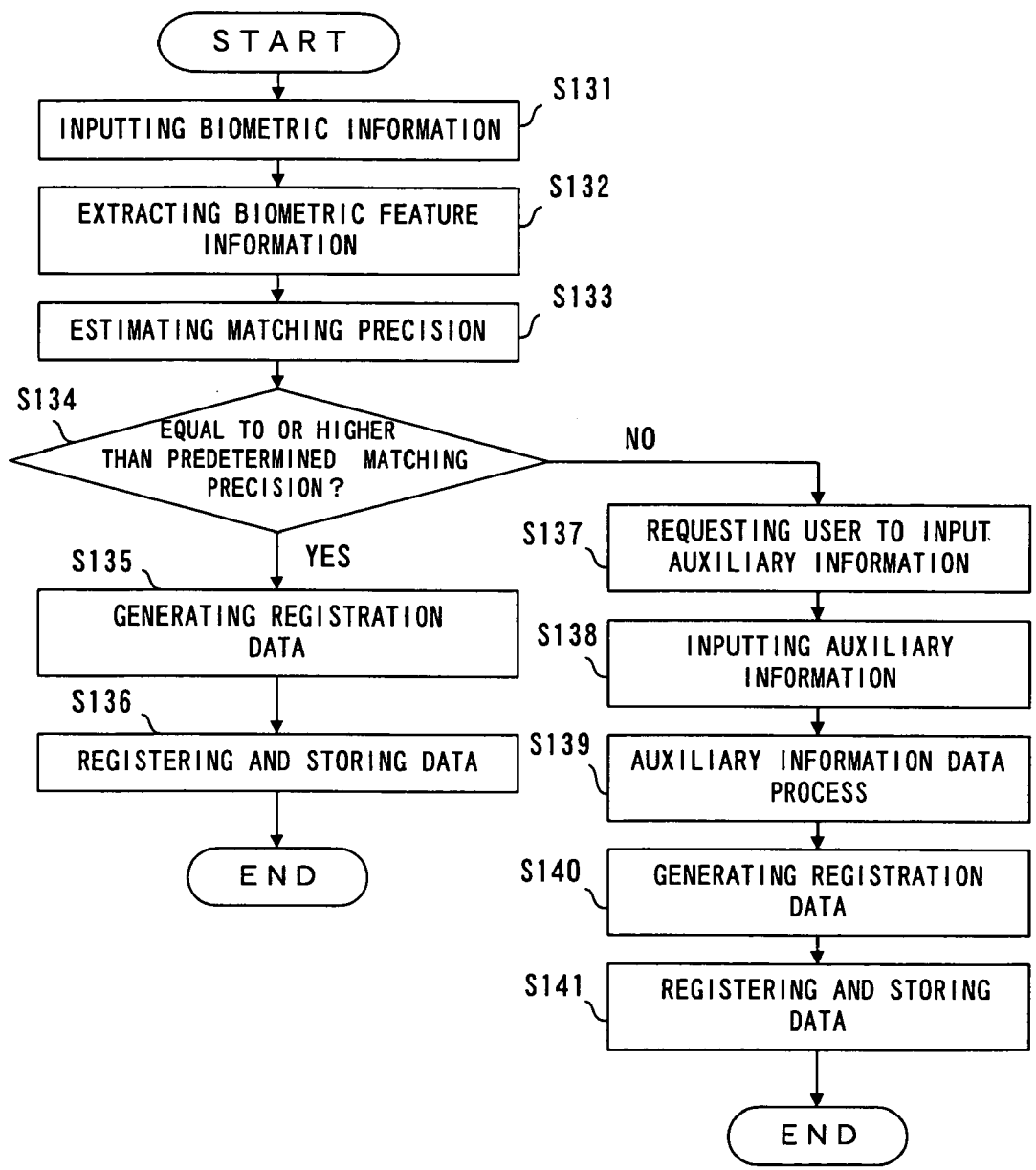
FIG. 19 is a flowchart of the first registering process

FIG. 19 is a flowchart of the registering process performed by the authentication apparatus shown in FIG. 18. The processes in steps S131 through S134 shown in FIG. 19 are the same as those in steps S1 through S4 shown in FIG. 5. The processes in steps S137 and S138 shown in FIG. 19 are the same as those in steps S9 and S10 shown in FIG. 5.

If the estimated matching precision is equal to or higher than predetermined matching precision in step S134, then the matching precision estimation unit 113 generates registration data of biometric feature information (step S135), and registers and stores the data in the biometric feature information registration and storage unit 120 (step S136), thereby terminating the process.

If auxiliary information is input in step S138, the auxiliary information input unit 115 performs an auxiliary information data process (step S139), and generates the registration data of the auxiliary information (step S140). In addition, the matching precision estimation unit 113 generates the registration data of the biometric feature information, and registers and stores the registration data of the biometric feature information in the biometric feature information registration and storage unit 120, The auxiliary information input unit 115 registers and stores the registration data of the auxiliary information in the auxiliary information registration and storage unit 121 (step S141), thereby terminating the process.

Figure 20:
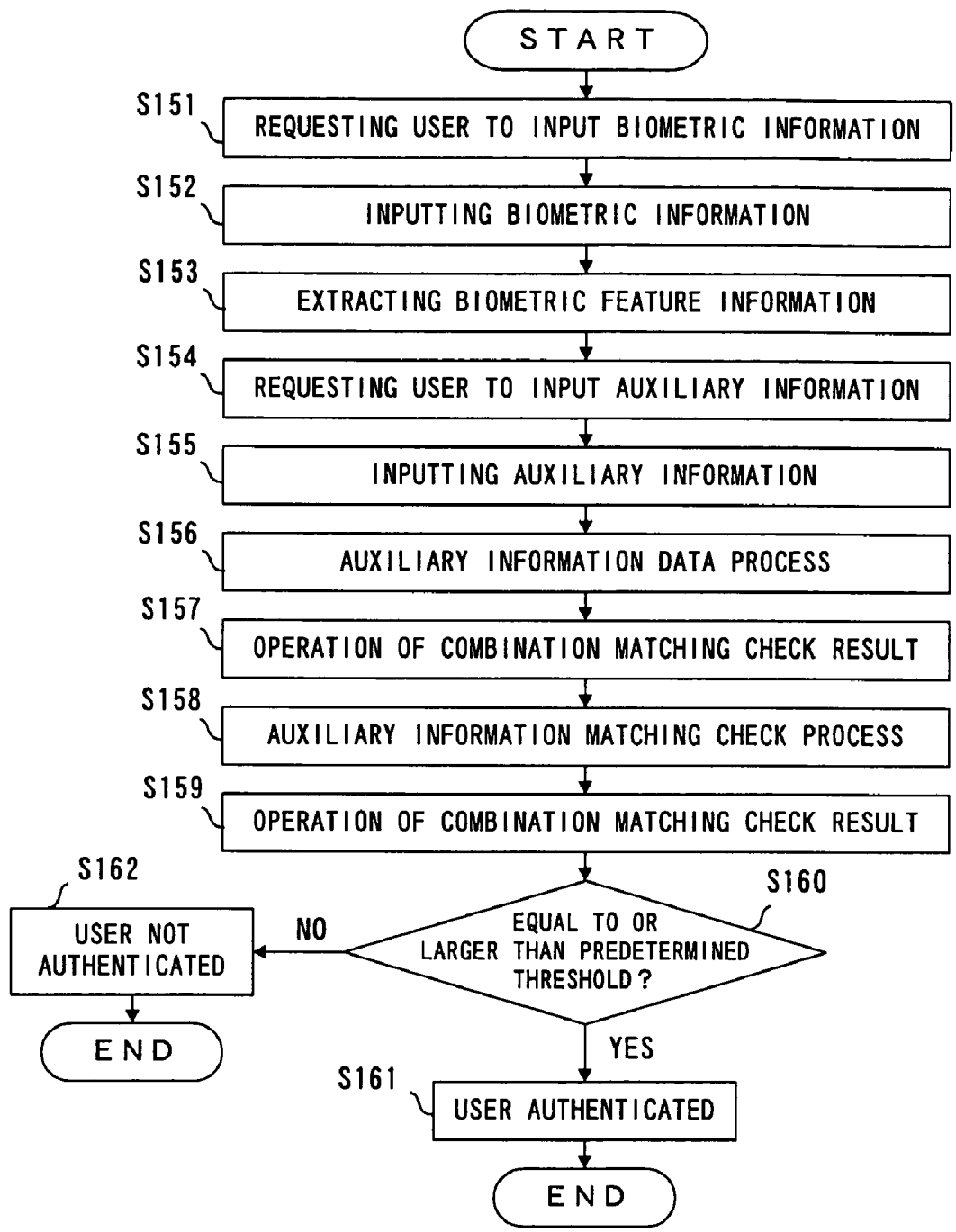
FIG. 20 is a flowchart of the fifth authenticating process.

FIG. 20 is a flowchart of the authenticating process according to auxiliary information performed by the authentication apparatus shown in FIG. 18. First, the biometric information input unit 111 requests the user to input biometric information (step S151), and inputs the information (step S152). The biometric feature information extraction unit 112 extracts biometric feature information from biometric information (step S153).

Then, the auxiliary information input unit 115 requests the user to input auxiliary information (step S154), inputs it (step S155), and performs auxiliary information data process (step S156). The processes in the subsequent steps S157 through S162 are the same as those in steps S11 through S16 shown in FIG. 5.

Especially when password information is used as auxiliary information, an auxiliary information setting unit 134 sets the necessary number of digits to supplement the matching precision attained by biometric feature information, and requests the user to register password information having the number of digits larger than the set number. By registering a password having the minimal number of digits, correct authentication can be guaranteed without lowering the convenience obtained by the biometric feature information. On the other hand, when the user forgets his or her password, biometric information can solve the problem.

The registration of biometric feature information and auxiliary information can be replaced with the registration of plural pieces of biometric feature information. For example, when a fingerprint is used, the fingerprint feature information about plurality of fingers is registered. The authentication apparatus determines the quality of the biometric feature information. If it determines that predetermined matching precision cannot be obtained, then it requests the user to register another piece of biometric feature information. When a matching check is carried out, a total score is computed from the matching check score of each piece of biometric feature information to authenticate the user. Thus, the probability of a non-matching result can be minimized.

In addition, different types of biometric feature information to be processed in different matching check methods can also be registered. The authentication apparatus determines the quality of the biometric feature information in the registering process. If it determines that predetermined matching precision cannot be obtained, then it requests the user to register another type of biometric feature information. By performing processes in plural types of matching check methods, the poor reproducibility of one type of biometric feature information can be successfully covered. When a matching check is carried out, the matching check results of all matching check methods are collectively determined to authenticate the user. Thus, the probability of a non-matching result can be minimized.

Then, the sixth authentication apparatus registers and stores biometric feature information and auxiliary information as a set of registration data. Data can be more simply managed by collectively managing registration data in the apparatus.

FIG. 21 shows the configuration of the above described authentication apparatus. The authentication apparatus shown in FIG. 21 comprises a biometric information input unit 131, a biometric feature information extraction unit 132, a matching precision estimation unit 133, an auxiliary information setting unit 134, an auxiliary information input unit 135, a storage unit 136, a matching check unit 137, a matching check result determination unit 138, and a control unit 139. The storage unit 136 comprises a registration data generation unit 140, a registration data storage unit 141, and a registration data separation unit 142. The matching check unit 137 comprises a biometric feature information matching check unit 143, and an auxiliary information matching check unit 144.

The operations of the biometric information input unit 131, the biometric feature information extraction unit 132, the matching precision estimation unit 133, the auxiliary information setting unit 134, the auxiliary information input unit 135, the biometric feature information matching check unit 143, the auxiliary information matching check unit 144, the matching check result determination unit 138, and the control unit 139 are the same as those of the authentication apparatus shown in FIG. 18.

The registration data generation unit 140 generates a set of registration data by combining biometric feature information with auxiliary information, and registers and stores in the registration data storage unit 141. The registration data separation unit 142 analyzes the registration data registered in the registration data storage unit 141 into biometric feature information and auxiliary information, and transmits the result to the matching check unit 137.

The authentication apparatus shown in FIG. 21 perform a registering process as shown in FIG. 19. In step S134 shown in FIG. 19, if the estimated matching precision is equal to or higher than predetermined matching precision, then thee registration data generation unit 140 generates registration data containing only biometric feature information (step S135), registers and stores the data in the registration data storage unit 141 (step S136), thereby terminating the process.

If auxiliary information is input in step S138, then the registration data generation unit 140 performs the auxiliary information data process (step S139), and generates registration data by combining biometric feature information with auxiliary information (step S140). Then, the registration data is registered and stored in the registration data storage unit 141 (step S141), thereby terminating the process.

Similarly, registration data can be generated by combining plural pieces of biometric feature information corresponding to the same matching check method, and can also be generated by combining plural types of biometric feature information processed in different matching check methods.

Next, the seventh authentication apparatus registers the type of auxiliary information when a registration matching check process is performed with biometric feature information associated with personal identification information. When personal identification information is input in a matching check process, the user is requested to input biometric information, and registered predetermined auxiliary information.

Figure 22:
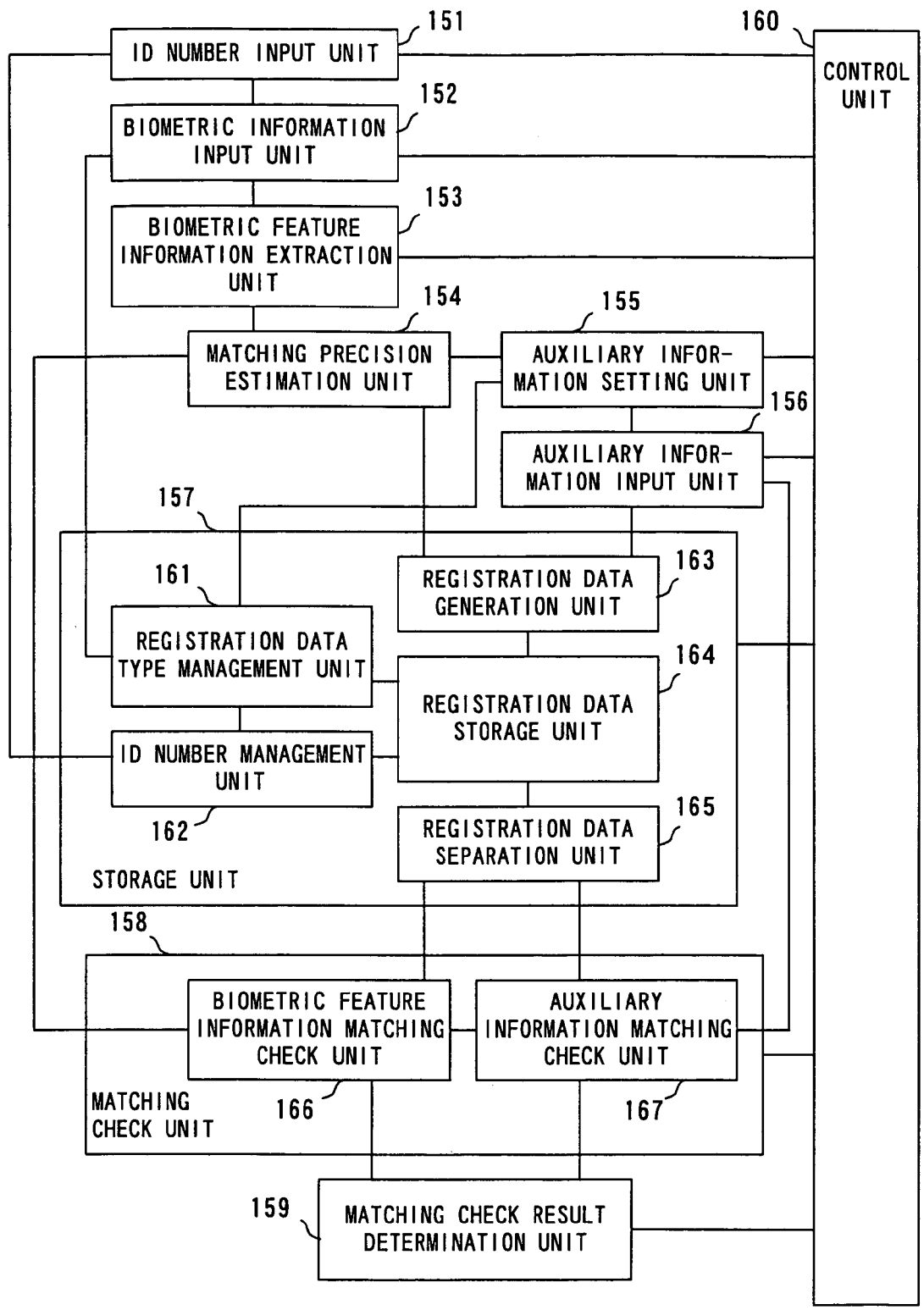
FIG. 22 shows the configuration of the seventh authentication apparatus.

FIG. 22 shows the configuration of the above described authentication apparatus. The authentication apparatus shown in FIG. 22 comprises an ID number input unit 151, a biometric information input unit 152, a biometric feature information extraction unit 153, a matching precision estimation unit 154, an auxiliary information setting unit 155, an auxiliary information input unit 156, a storage unit 157, a matching check unit 158, a matching check result determination unit 159, and a control unit 160.

The storage unit 157 comprises a registration data type management unit 161, an ID number management unit 162, a registration data generation unit 163, a registration data storage unit 164, and a registration data separation unit 165. The matching check unit 158 comprises a biometric feature information matching check unit 166, and an auxiliary information matching check unit 167.

The operations of the biometric information input unit 152, the biometric feature information extraction unit 153, the matching precision estimation unit 154, the auxiliary information setting unit 155, the auxiliary information input unit 156, the registration data generation unit 163, the registration data storage unit 164, the registration data separation unit 165, the biometric feature information matching check unit 166, the auxiliary information matching check unit 167, the matching check result determination unit 159, and the control unit 160 are the same as those of the authentication apparatus shown in FIG. 21.

The registration data type management unit 161 and the ID number management unit 162 corresponds to a database storing the correspondence between a user registration ID number and the type of registration data. When the registration data generation unit 163 registers registration data in the registration data storage unit 164, the registration data type management unit 161 stores the type of auxiliary information contained in the registration data, and the ID number management unit 162 stores a corresponding ID number.

If the ID number input unit 151 inputs the ID number of a user when a matching check process is performed, then the registration data type management unit 161 notifies the auxiliary information setting unit 155 of the type of the auxiliary information corresponding to the ID number. The auxiliary information setting unit 155 requests the user to input the notified auxiliary information.

Figure 23:
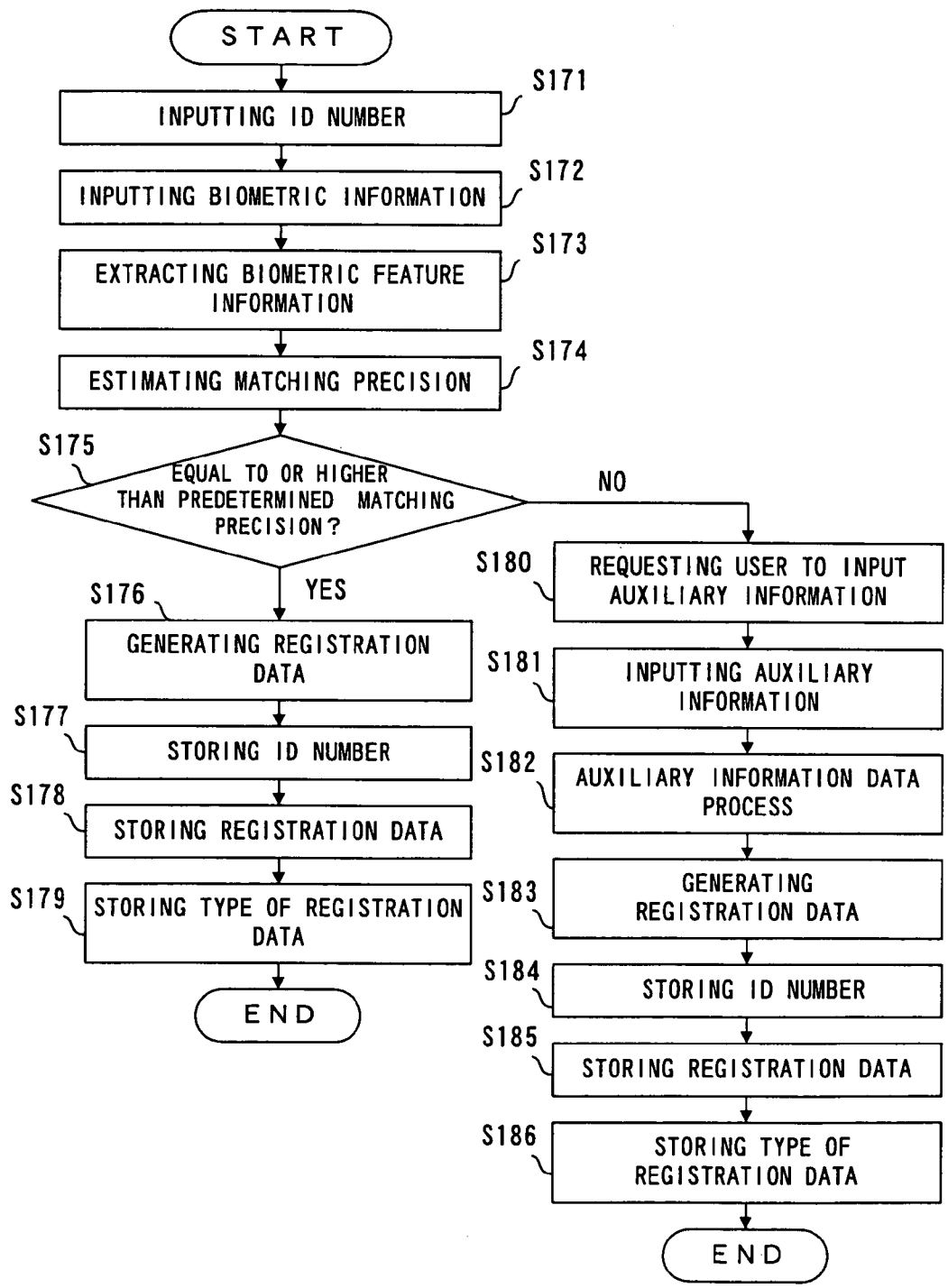
FIG. 23 is a flowchart of the second registering process.

FIG. 23 is a flowchart of the registering process performed by the authentication apparatus shown in FIG. 22. First, the ID number input unit 151 inputs the ID number of a user (step S171). The processes in steps S172 through S176 are the same as those in steps S131 through S135 shown in FIG. 19. The processes in steps S180 through S183 shown in FIG. 12 are the same as those in steps S137 through S140 shown in FIG. 19. However, in step S183, registration data is generated by combining biometric feature information with auxiliary information.

When registration data is generated in step S176, the ID number management unit 162 stores an ID number (step S177), the registration data storage unit 164 stores registration data (step S178), and the registration data type management unit 161 stores the type of the biometric feature information contained in the registration data (step S179), thereby terminating the process.

When registration data is generated in step S183, the ID number management unit 162 stores an ID number (step S184), the registration data storage unit 164 stores registration data (step S185), and the registration data type management unit 161 stores the types of the biometric feature information and the auxiliary information contained in the registration data (step S186), thereby terminating the process.

Figure 24:
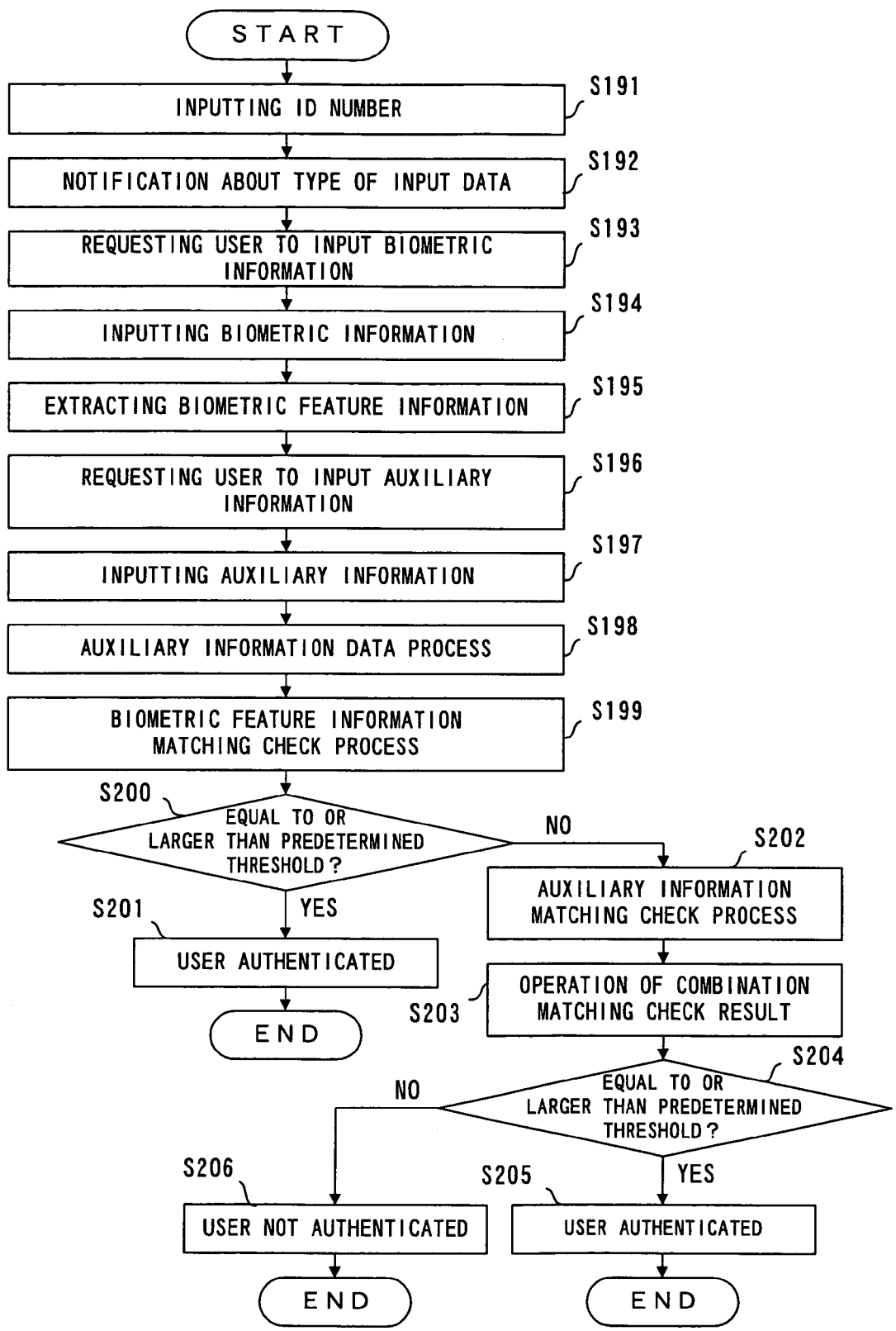
FIG. 24 is a flowchart of the sixth authenticating process.

FIG. 24 is a flowchart of the authenticating process performed by the authentication apparatus shown in FIG. 22. First, the ID number input unit 151 inputs an ID number of a user (step S191), and the registration data type management unit 161 notifies the biometric information input unit 152 and the auxiliary information setting unit 155 of the type of the input data (step S192).

The processes in steps S193 through S198 are the same as those in steps S151 through S156 shown in FIG. 20. In addition, the processes in steps S199 through S201 are the same as those in steps S5 through S7 shown in FIG. 5. The processes in steps S202 through S206 are the same as those in steps S158 through S162 shown in FIG. 20.

Also when plural pieces of biometric feature information corresponding to the same matching check method or plural types of biometric feature information processed in different matching check methods are used as registration data, the type of registration data can be registered for each ID number of a user. In this case, the user is requested to input biometric information corresponding to the input ID number.

Described below is the client-server type authentication system for having a matching check by a server after matching check data is transmitted from a client to the server. In this system, the type of auxiliary information is registered when a registering and matching check process is performed with biometric feature information associated with an ID number. When the client inputs the ID number of the user in the matching check process, the server requests the user to input biometric information based on the ID number, and also requests the user input predetermined auxiliary information.

Figure 25:
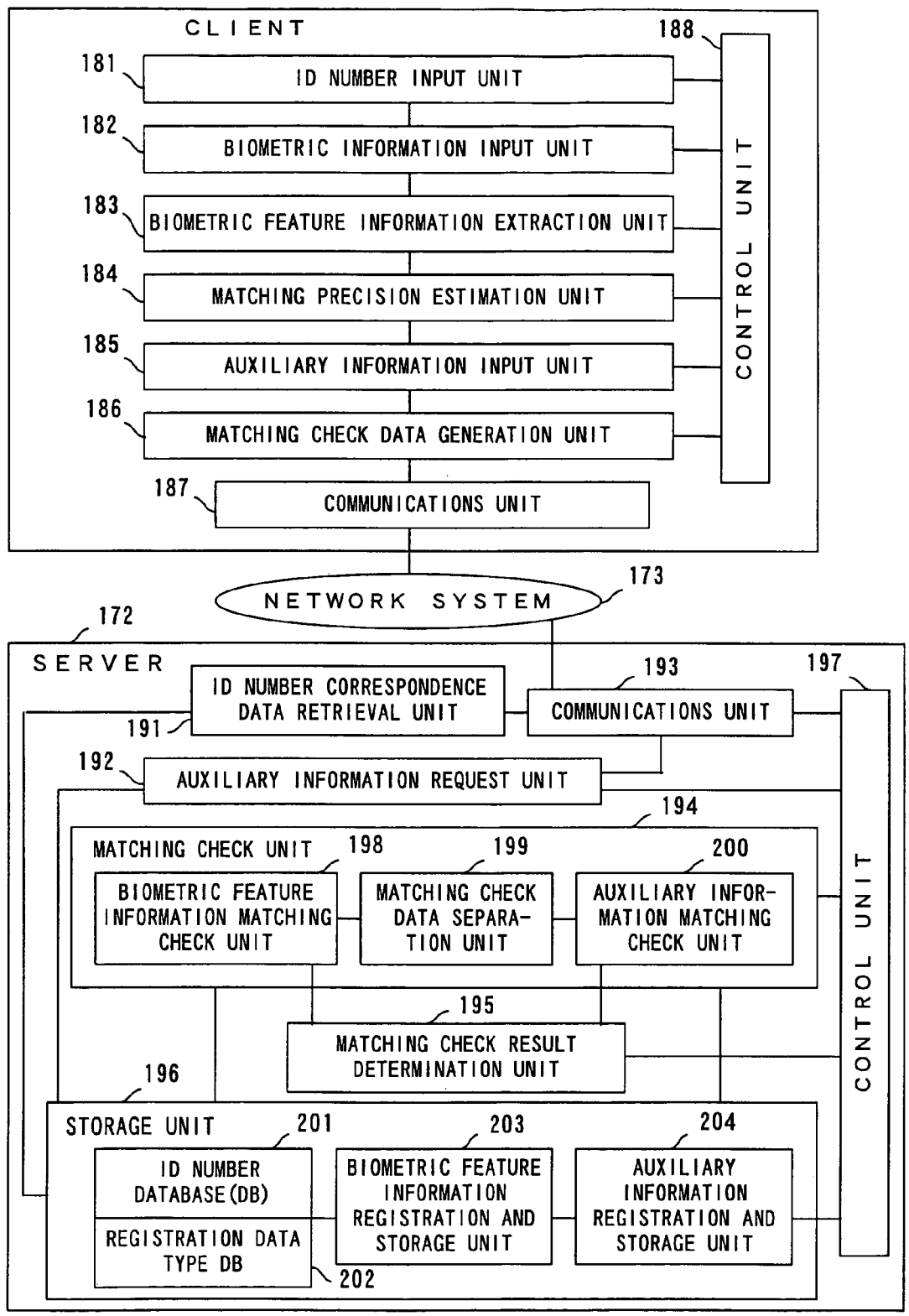
FIG. 25 shows the configuration of the second client-server system.

FIG. 25 shows the configuration of the above described authentication system. The authentication system shown in FIG. 25 comprises a client 171, a server 172, and a network system 173 for connecting them. The network system 173 includes any network such as a LAN, a WAN, and so on.

The client 171 comprises an ID number input unit 181, a biometric information input unit 182, a biometric feature information extraction unit 183, a matching precision estimation unit 184, an auxiliary information input unit 185, a matching check data generation unit 186, a communications unit 187, and a control unit 188.

The server 172 comprises an ID number correspondence data retrieval unit 191, an auxiliary information request unit 192, a communications unit 193, a matching check unit 194, a matching check result determination unit 195, a storage unit 196, and a control unit 197. The matching check unit 194 comprises a biometric feature information matching check unit 198, a matching check data separation unit 199, and an auxiliary information matching check unit 200. The storage unit 196 comprises an ID number database (DB) 201, a registration data type DB 202, a biometric feature information registration and storage unit 203, and an auxiliary information registration and storage unit 204.

The operations of the biometric information input unit 182, the biometric feature information extraction unit 183, the matching precision estimation unit 184, the auxiliary information input unit 185, the matching check data generation unit 186, the communications unit 187, the control unit 188, the communications unit 193, the biometric feature information matching check unit 198, the matching check data separation unit 199, the auxiliary information matching check unit 200, the matching check result determination unit 195, the biometric feature information registration and storage unit 203, the auxiliary information registration and storage unit 204, and the control unit 197 are the same as those in the authentication system shown in FIG. 14.

The matching check data generation unit 186 and the matching check data separation unit 199 also function respectively as the registration data generation unit 163 and the registration data separation unit 165 shown in FIG. 22. The ID number input unit 181, the ID number database (DB) 201, and the registration data type DB 202 respectively correspond to the ID number input unit 151, the ID number management unit 162, and the registration data type management unit 161 shown in FIG. 22.

When the ID number input unit 181 inputs the registered ID number of a user in the matching check process, the input ID number is transmitted to the server 172. The ID number correspondence data retrieval unit 191 retrieves the ID number database (DB) 201 and the registration data type DB 202 using the received ID number as a key, and obtains the type of the registration data corresponding to the ID number. The auxiliary information request unit 192 notifies the client 171 of the type of the registration data as the type of necessary matching check data. The auxiliary information input unit 185 requests the user to input the auxiliary information corresponding to the notified type.

Figure 26:
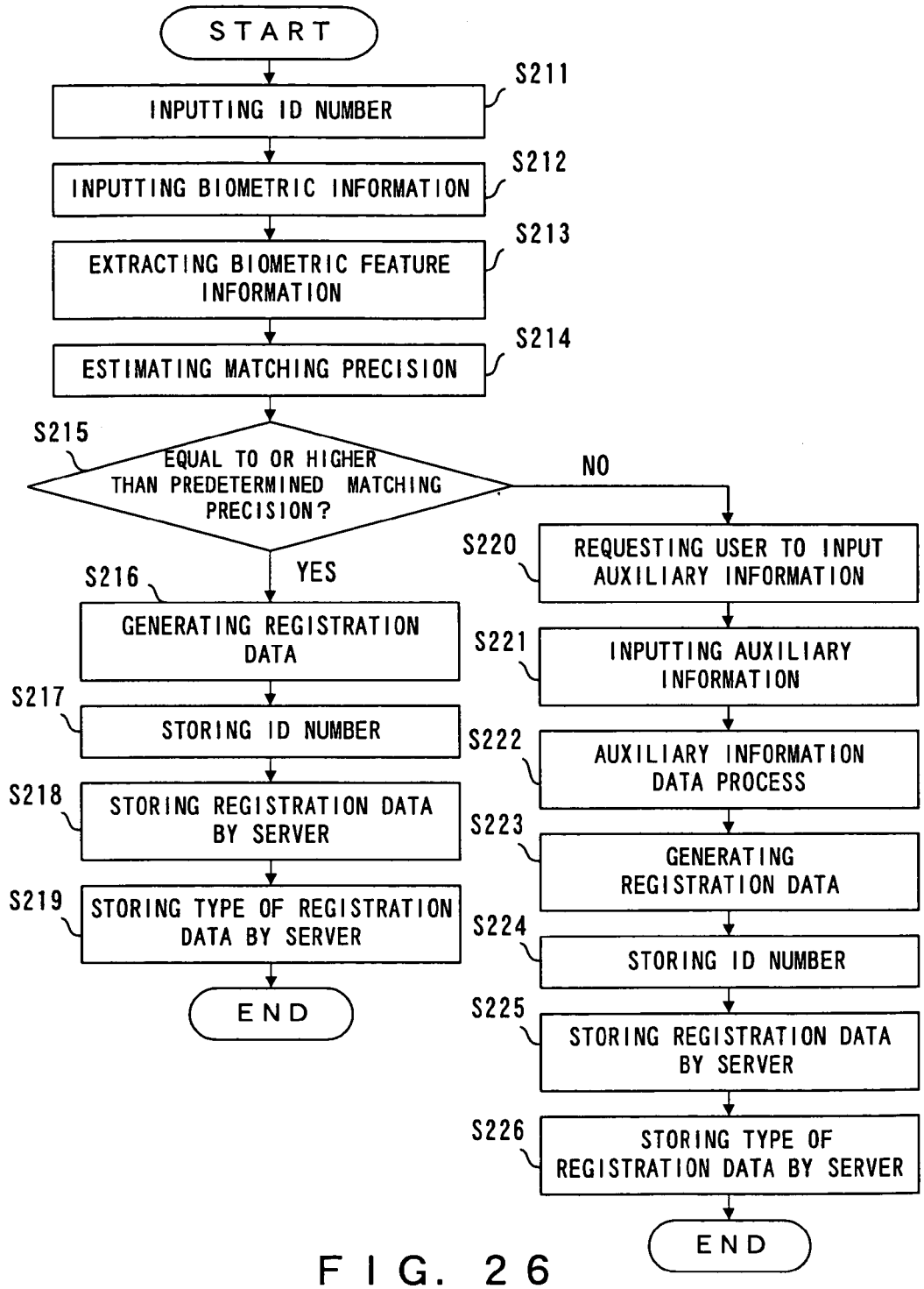
FIG. 26 is a flowchart of the third registering process.

FIG. 26 is a flowchart of the registering process performed by the authentication system shown in FIG. 25. The processes in steps S211 through S216 shown in FIG. 26 are performed by the client 171, and are the same as those in steps S171 through S176 shown in FIG. 23. The processes in steps S220 through S223 shown in FIG. 26 are performed by the client 171, and are the same as those in steps S180 through S183 shown in FIG. 23.

In steps S216 and S223, the matching check data generation unit 186 generates registration data, and the communications unit 187 transmits the data to the server 172. When the communications unit 193 receives the registration data generated in step S216, the ID number DB 201 stores the ID number (step S217), the biometric feature information registration and storage unit 203 stores biometric feature information contained in the registration data (step S218), and the registration data type DB 202 stores the type of the biometric feature information (step S219), thereby terminating the process.

When the communications unit 193 receives the registration data generated in step S223, the ID number DB 201 stores the ID number (step S224), the biometric feature information registration and storage unit 203 stores the biometric feature information contained in the registration data, the auxiliary information registration and storage unit 204 stores the auxiliary information contained in the registration data (step S225), and the registration data type DB 202 stores the type of the biometric feature information and the auxiliary information (step S226), thereby terminating the process.

Figure 27:
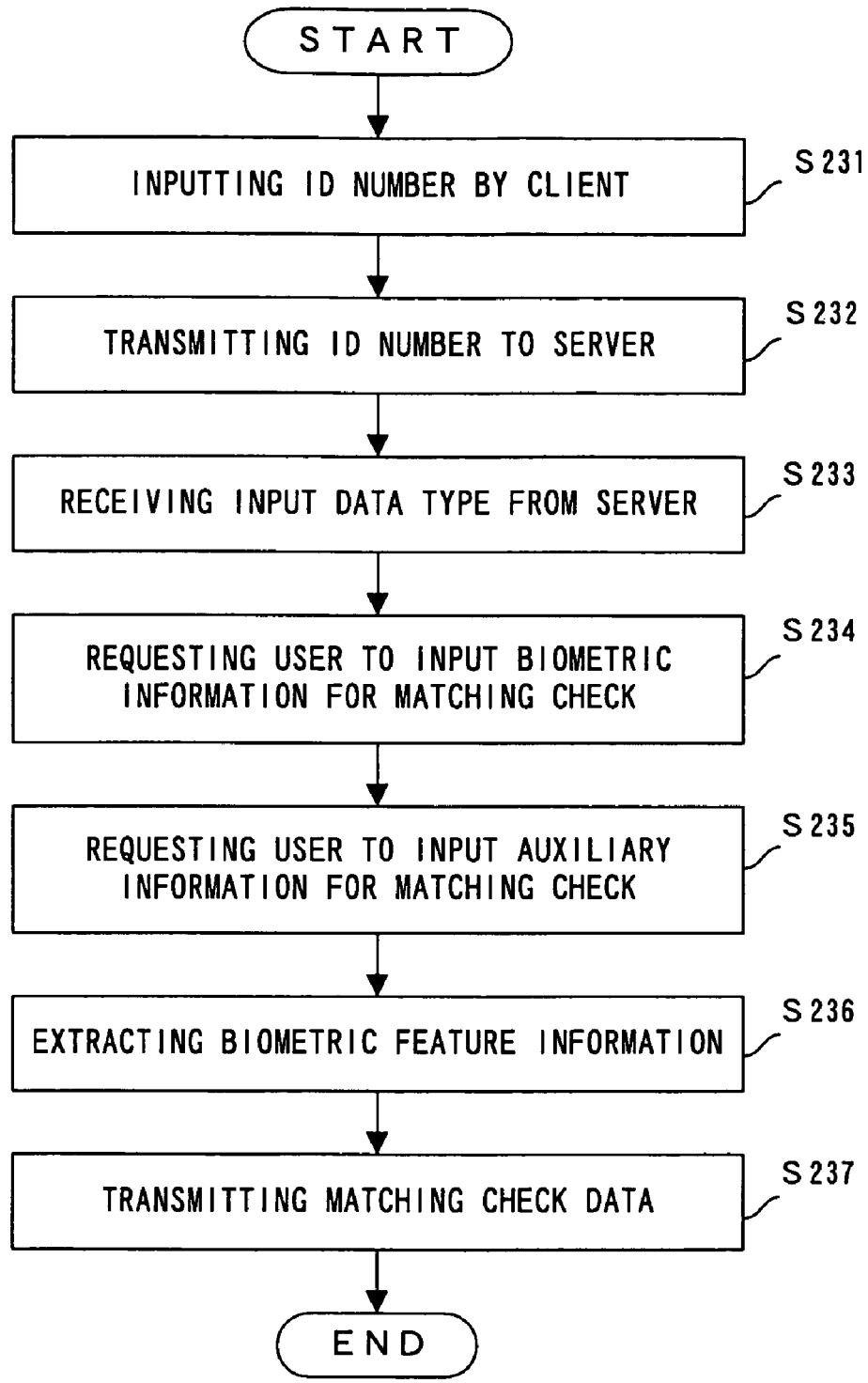
FIG. 27 is a flowchart of the second client process.

FIG. 27 is a flowchart of the authenticating process performed by the client 171 shown in FIG. 25. First, the ID number input unit 151 inputs the ID number of a user (step S231), the communications unit 187 transmits the input ID number to the server 172 (step S232). The ID number correspondence data retrieval unit 191 of the server 172 obtains the type of the registration data corresponding to the received ID number, and the auxiliary information request unit 192 transmits it as the type of the input data for use in a matching check to the client 171.

The communications unit 187 receives the type of the input data (step S233). Then, the biometric information input unit 182 requests the user to input biometric information for use in a matching check according to the notification from the server 172, and inputs the biometric information (step S234). In addition, the auxiliary information input unit 185 requests the user to input auxiliary information for use in a matching check according to the notification from the server 172, and inputs the biometric information (step S235).

Then, the biometric feature information extraction unit 183 extracts the biometric feature information from the biometric information (step S236), the matching check data generation unit 186 generates matching check data by combining the biometric feature information with the auxiliary information. Then, the communications unit 187 transmits the generated matching check data to the server 172 (step S237), thereby terminating the process.

Figure 28:
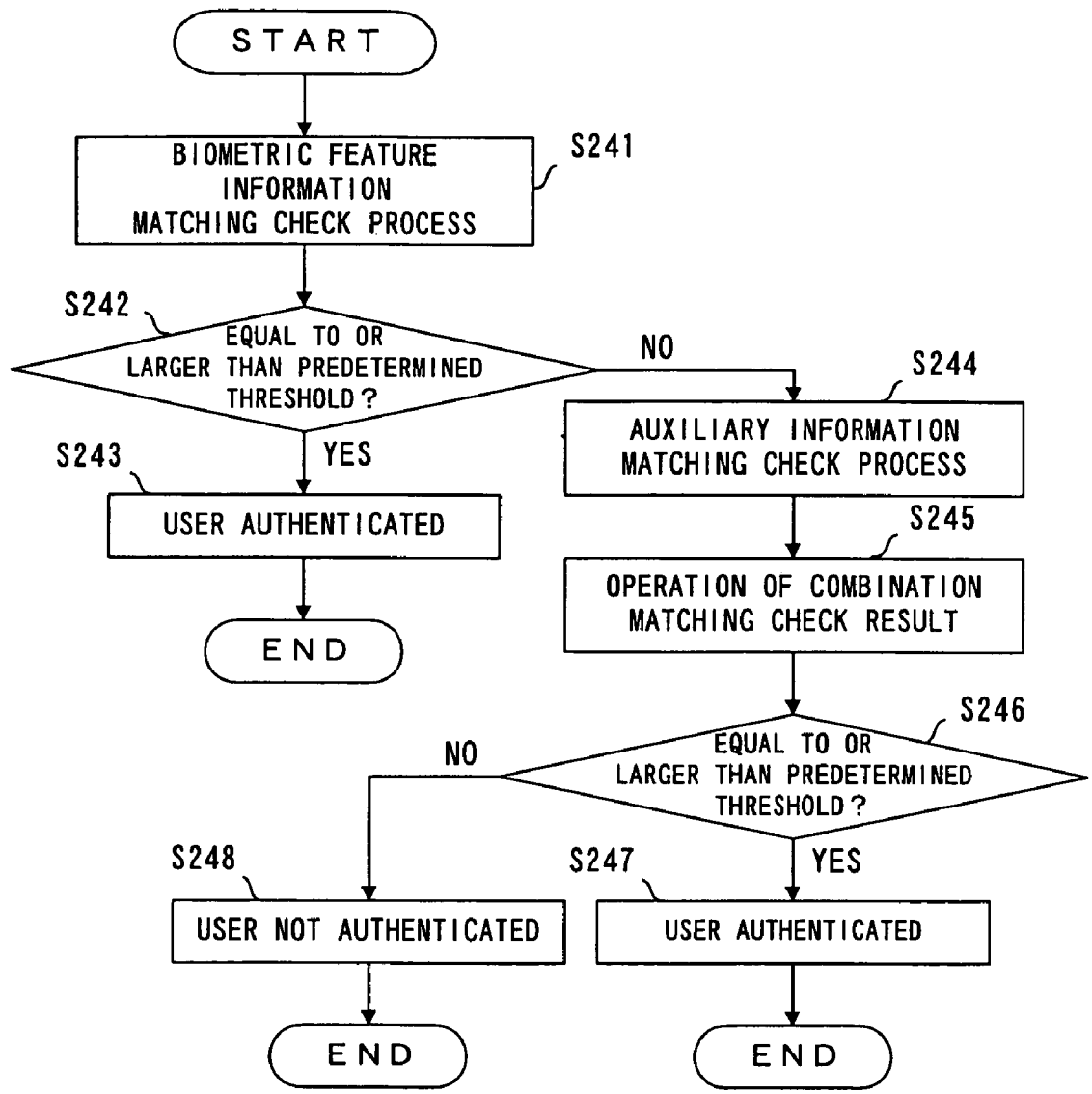
FIG. 28 is a flowchart of the third server process.

FIG. 28 is a flowchart of the authenticating process performed by the server 172 who received the matching check data. The processes in steps S241 through S248 shown in FIG. 28 are performed after the matching check data has been divided into the biometric feature information and the auxiliary information, and are the same as those in steps S199 through S206 shown in FIG. 24.

In addition, when plural pieces of biometric feature information corresponding to the same matching check method, and plural different types of biometric feature information are used as matching check data, registration data and matching check data are generated on the client side, and registered and matching-checked on the server side.

FIG. 29 shows the combination of matching check data used in a client-server type authenticating system. In FIG. 29, matching check data 213 transmitted from a client 211 to a server 212 is generated by combining biometric feature information with auxiliary information, combining plural pieces of biometric feature information of one type, combining plural types of biometric feature information, and so on. As an example of auxiliary information, a password is used, and as examples of plural pieces of biometric feature information, forefinger fingerprint feature information and middle finger fingerprint feature information are used.

On the other hand, remote authentication in a remote authentication dial-in user service (RADIUS), and dial-up authentication in a point-to-point protocol (PPP) can be used as a client-server type authenticating method.

When the remote authentication in the RADIUS is used, the registration data or the matching check data generated by a client is stored in a user name (USER-NAME) area of the RADIUS protocol and a user password (USER-PASSWORD) area, and transmitted from a client to a server. Furthermore, the registration data or the matching check data can also be stored in the EAP (extensible authentication protocol) message area of the RADIUS protocol, and transmitted from a client to a server.

Thus, a remote authentication procedure in the RADIUS can be used as is by processing the matching check data as a set of data, storing the data in a specific area of the RADIUS protocol, and transmitting the data.

When the dial-up authentication in the PPP is used, the registration data or the matching check data generated by a client is stored in a user name area of the PPP protocol and a user password area, and transmitted from a client to a server. Thus, a dial-up authentication procedure in the PPP can be used as is by processing the matching check data as a set of data, storing the data in a specific area of the PPP protocol, and transmitting the data.

In the case of the authentication system in the dial-up method, the client stores registration data and matching check data as the quantity of data within a predetermined value transferrable in the PPP for transmission to the server. The predetermined value can be, for example, 300 bytes. Thus, the remote authentication procedure in the RADIUS and the dial-up authentication procedure in the PPP can be used as is.

As shown in FIG. 30, an ID number input by a user can be assigned an identification code (for example, a character code) corresponding to the type of registration data. Using such an identification code, a client can determine, without asking the server, what type of biometric information or auxiliary information the client should request when the ID number is input.

As shown in FIG. 31, the information about the type of biometric information and auxiliary information can be described in the matching check data. By adding such type information, the matching check data can be easily separated when the matching check data is transmitted to a matching check unit. This holds true with the registration data.

As shown in FIG. 32, the format information indicating the configuration of the matching check data can be described in the matching check data. By adding the format information, the matching check data can be easily separated when the matching check data is transmitted to a matching check unit. This holds true with the registration data.

The eighth authentication apparatus registers biometric feature information and auxiliary information when a registering process is performed, and a user is requested to input biometric information and auxiliary information. By requesting the user to input auxiliary information, a matching check result can be obtained at predetermined matching precision even when biometric information is changed or the biometric feature information has poor reproducibility. As a result, the user can be easily authenticated without making biometric information unavailable.

FIG. 33 shows the configuration of the above described authentication apparatus. The authentication apparatus shown in FIG. 33 comprises a biometric information input unit 221, a biometric feature information extraction unit 222, an auxiliary information input unit 223, a matching check unit 224, a matching check result determination unit 225, a storage unit 226, and a control unit 227. The matching check unit 224 comprises a biometric feature information matching check unit 228 and an auxiliary information matching check unit 229. The storage unit 226 comprises a biometric feature information registration and storage unit 230, and an auxiliary information registration and storage unit 231. The operations of respective units are the same as in the authentication apparatus shown in FIG. 2. However, since there are no matching precision estimation units or auxiliary information setting units, the entire configuration is simpler.

FIG. 34 is a flowchart of the authenticating process performed by the authentication apparatus shown in FIG. 33. First, the biometric information input unit 221 input the biometric information of a user (step S251). The auxiliary information input unit 223 inputs auxiliary information (step S252). The biometric feature information extraction unit 222 extracts biometric feature information from the input biometric information (step S253). The subsequent processes in steps S254 through S261 are the same as those in steps S241 through S248 shown in FIG. 28.

Figure 35:
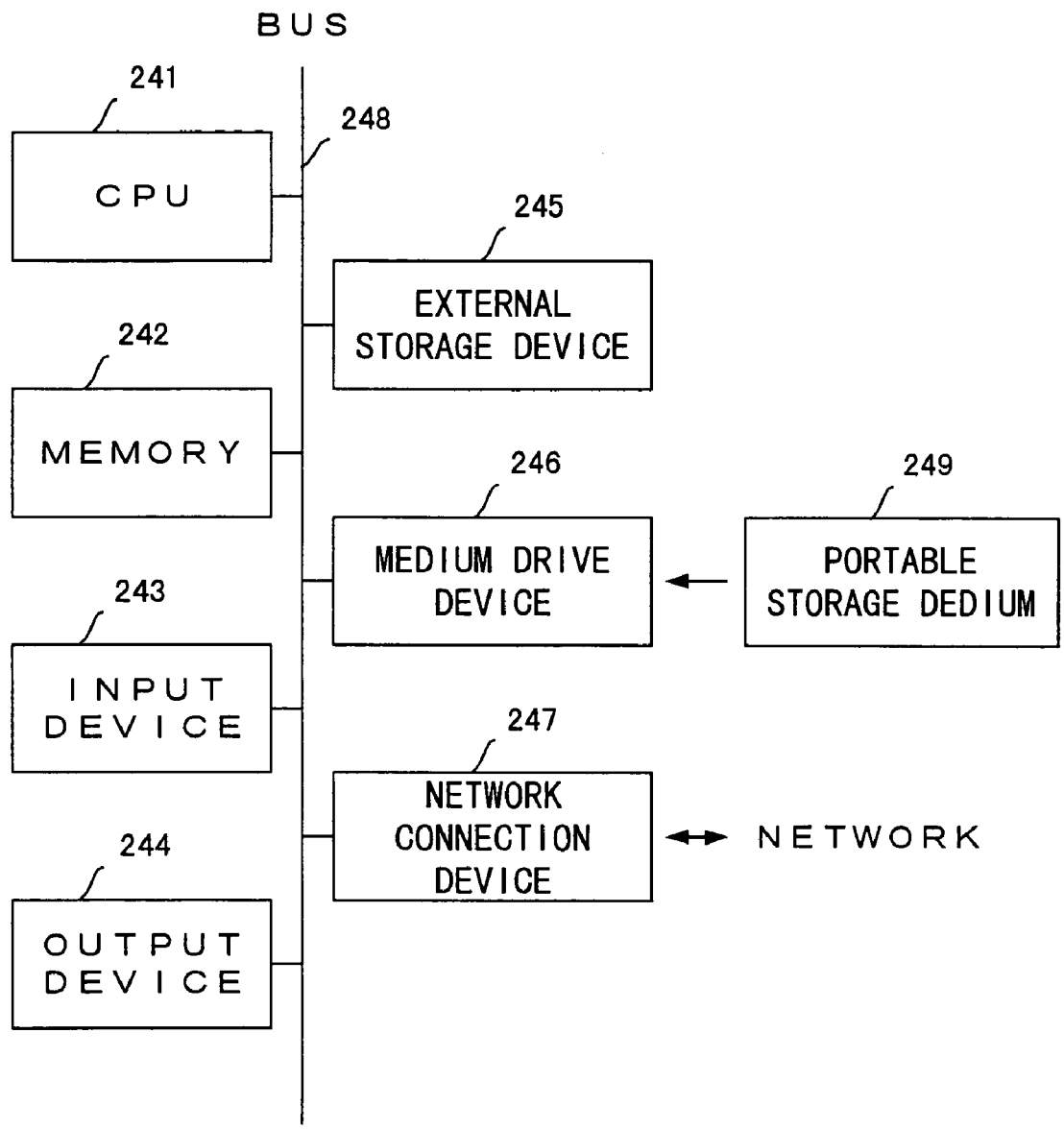
FIG. 35 shows the configuration of the information processing device.

The above described authentication apparatus, client, and server can be designed using the information processing device (computer) as shown in FIG. 35. The information processing device shown in FIG. 35 comprises a CPU (central processing unit) 241, memory 242, an input device 243, an output device 244, an external storage device 245, a medium drive device 246, and a network connection device 247. They are interconnected through a bus 248.

The memory 242 comprises, for example, ROM (read-only memory), RAM (random access memory), and so on, and stores a program and data used in performing processes. The CPU 241 performs necessary processes by executing a program using the memory 242.

The input device 243 can be, for example, a keyboard, a pointing device, a touch panel, and so on, and is used when a user inputs an instruction and information. The output device 244 can be, for example, a display, a printer, a speaker, and so on, and is used when an inquiry and a process result are output to a user.

The external storage device 245 can be, for example, a magnetic disk device, an optical disk device, a magneto-optical disk) device, and so on. The information processing device stores the above described program and data in the external storage device 245, and loads them to the memory 242 for use as necessary. The external storage device 245 can also be used as a database storing registration data, the type of registration data, an ID number, and so on.

The medium drive device 246 drives a portable storage medium 249, and accesses the recorded contents. The portable storage medium 249 can be any computer readable storage medium such as a memory card, floppy disk, CD-ROM (compact disk read-only memory), an optical disk, a magneto-optical disk, and so on. The administrator stores the above described program and data in the portable storage medium 249, and the information processing device loads them to the memory 242, and so on, for use as necessary.

The network connection device 247 communicates with an external device through any network (line), and converts data in the communications. Furthermore, the information processing device receives the above described program and data from an external device as necessary through the network connection device 247, and loads them in the memory 242 for use.

FIG. 36 shows a computer-readable storage medium capable of providing a program and data for the information processing device shown in FIG. 35. A program and data stored in the portable storage medium 249 and an external database 250 are loaded onto the memory 242. Then, the CPU 241 executes the program using the data, and performs necessary processes.

According to the present invention, in the user authentication technology using biometric information, a value-added process can be performed at high precision by using additional authentication data even if the biometric feature information of a user has poor reproducibility. Therefore, a user having poor reproducibility about biometric feature information can use the authentication system.

In addition, a client-server type authentication system can be operated with communications cost reduced by transferring biometric feature information and additional authentication data as a set of matching check data.

What is claimed is:

1. An authentication apparatus, comprising:
   a biometric information input unit inputting biometric information;
   an extraction unit extracting biometric feature information from the input biometric information;
   an estimation unit estimating matching precision of the extracted biometric feature information;
   a request unit requesting an input of additional authentication information different from the input biometric information when said estimation unit estimates that a predetermined matching precision cannot be obtained;
   an authentication unit information input unit inputting the authentication information;
   a biometric feature information registration unit preliminarily storing registered biometric feature information;
   an authentication information registration unit preliminarily storing additional registered authentication information;
   a biometric feature information matching check unit having a matching check between the extracted biometric feature information and the registered biometric feature information;
   an authentication information matching check unit having a matching check between the input authentication information and the registered authentication information; and
   a determination unit computing matching precision by combining a matching check result about biometric feature information with a matching check result about additional authentication information, and determining based on a computation result whether or not a user is authenticated.

2. The apparatus according to claim 1, wherein
said request unit requests password information as the authentication information, said authentication information input unit inputs the password information, said authentication information registration unit preliminarily stores registered password information as the registered authentication information, and said authentication information matching check unit has a matching check between the input password information and the registered password information.

3. The apparatus according to claim 2, wherein
said request unit comprises a setting unit setting a number of digits of password information required to obtain the predetermined matching precision, and requesting an input of the set number of digits of password information.

4. The apparatus according to claim 3, wherein
said number of digits is set based on the matching precision estimated by said estimation unit, and said authentication information matching check unit has a matching check between the input password information and a predetermined part of the registered password information.

5. The apparatus according to claim 1, wherein said determination unit inputs authentication information stored in a medium.

6. An authentication apparatus, comprising:
   a biometric information input unit inputting biometric information;
   an extraction unit extracting biometric feature information from the input biometric information;
   an estimation unit estimating matching precision of the extracted biometric feature information;
   a request unit requesting an input of other biometric information different from the input biometric information when said estimation unit estimates that a predetermined matching precision cannot be obtained;
   a biometric feature information registration unit preliminarily storing plural pieces of registered biometric feature information;
   a biometric feature information matching check unit having a matching check between the extracted biometric feature information and the registered biometric feature information; and
   a determination unit computing matching precision by combining matching check results about the plural pieces of biometric feature information extracted from plural pieces of input biometric information, and determining based on a computation result whether or not a user is authenticated.

7. The apparatus according to claim 6, wherein
said request unit requests an input of other biometric information of a same type as the biometric information used in estimating matching precision, and said biometric information input unit inputs other biometric information of the same type at the request.

8. The apparatus according to claim 7, wherein
said biometric input unit inputs fingerprint information as biometric information, and requests an input of fingerprint information about a finger different from a finger used in fingerprint information in a matching check for estimating the matching precision.

9. The apparatus according to claim 6, wherein
said request unit requests an input of biometric information of a different type from biometric information used in estimating matching precision, and said biometric information input unit inputs biometric information of a different type.

10. An authentication apparatus, comprising:
a biometric information input unit inputting biometric information;
an extraction unit extracting biometric feature information from the input biometric information;
an authentication information input unit inputting additional authentication information different from the input biometric information;
a biometric feature information registration unit preliminarily storing registered biometric feature information;
an authentication information registration unit preliminarily storing additional registered authentication information;
a biometric feature information matching check unit having a matching check between the extracted biometric feature information and the registered biometric feature information;
an authentication information matching check unit having a matching check between the input authentication information and the registered authentication information when the predetermined matching precision cannot be obtained from the matching check result about the biometric feature information; and
a determination unit computing matching precision by combining a matching check result about biometric feature information with a matching check result about additional authentication information, and determining based on a computation result whether or not a user is authenticated.

11. The apparatus according to claim 10, wherein
said biometric information relates to one of fingerprint information, iris information, voiceprint information, retina blood vessel distribution information, signature information, face image information, and DNA information.

12. A client device in a client-server type authentication system, comprising:
a biometric information input unit inputting biometric information;
an extraction unit extracting biometric feature information from the input biometric information;
an estimation unit estimating matching precision of the extracted biometric feature information;
a request unit requesting an input of additional authentication information different from the input biometric information when said estimation unit estimates that a predetermined matching precision cannot be obtained;
an authentication information input unit inputting the authentication information;
a generation unit generating matching check data by combining the extracted biometric feature information with the input authentication information; and
a communications unit transmitting the matching check data to a server to have a matching check between the generated matching check data and registered information.

13. The apparatus according to claim 12, wherein
said matching data generation unit described in the matching data at least one of the extracted biometric feature information, type information about the input authentication information, and format information about the matching data device.

14. A server device in a client-server type authentication system, comprising:
a communications unit receiving from a client biometric feature information and additional authentication information different from the biometric feature information;
a biometric feature information registration unit preliminarily storing registered biometric feature information;
an authentication information registration unit preliminarily storing additional registered authentication information;
a biometric feature information matching check unit having a matching check between the received biometric feature information and the registered biometric feature information;
an authentication information matching check unit having a matching check between the received authentication information and the registered authentication information; and
a determination unit computing matching precision by combining a matching check result about biometric feature information with a matching check result about additional authentication information, and determining based on a computation result whether or not a user is authenticated.

15. An authentication apparatus, comprising:
a biometric information input unit inputting biometric information;
an extraction unit extracting biometric feature information from the input biometric information;
an estimation unit estimating matching precision of the extracted biometric feature information;
a request unit requesting an input of additional authentication information different from the input biometric information when said estimation unit estimates that a predetermined matching precision cannot be obtained;
an authentication information input unit inputting the authentication information;
a biometric feature information registration unit storing the biometric feature information as registered biometric feature information;
an authentication information registration unit storing the authentication information as additional registered authentication information;
a biometric feature information matching check unit having a matching check between biometric feature information extracted from the biometric information input for authentication and registered biometric feature information;

an authentication information matching check unit having a matching check between the authentication information input for authentication and the registered authentication information; and a determination unit computing matching precision by combining a matching check result about biometric feature information with a matching check result about the additional authentication information, and determining based on a computation result whether or not a user is authenticated.

16. A client device in a client-server type authentication system, comprising:
   a biometric information input unit inputting biometric information;
   an extraction unit extracting biometric feature information from the input biometric information;
   an estimation unit estimating matching precision of the extracted biometric feature information;
   a request unit requesting an input of additional authentication information different from the input biometric information when said estimation unit estimates that a predetermined matching precision cannot be obtained;
   an authentication information input unit inputting the authentication information;
   a generation unit generating registration data by combining the extracted biometric feature information with the input authentication information; and
   a communications unit transmitting the registration data to a server to register the generated registration data.

17. A server device in a client-server type authentication system, comprising:
   a communications unit receiving from a client biometric feature information and additional authentication information different from the biometric feature information;
   a biometric feature information registration unit storing the received biometric feature information as registered biometric feature information;
   an authentication information registration unit storing the received authentication information as additional registered authentication information;
   a biometric feature information matching check unit having a matching check between the biometric feature information received from a client for authentication and the registered biometric feature information;
   an authentication information matching check unit having a matching check between the authentication information received from the client for authentication and the registered authentication information; and
   a determination unit computing matching precision by combining a matching check result about biometric feature information with a matching check result about additional authentication information, and determining based on a computation result whether or not a user is authenticated.

18. The apparatus according to claim 17, further comprising:
   a database unit managing a type of registered information stored corresponding each of piece identification information;
   a retrieval unit retrieving a type of registered information corresponding to identification received from a client; and
   a request unit requesting the client to input matching information corresponding to the retrieved type.

19. An authenticating method, comprising:
   obtaining biometric information;
   extracting biometric feature information from the received biometric information;
   estimating matching precision of the extracted biometric feature information;
   obtaining additional authentication information different from the input biometric information when said estimation unit estimates that a predetermined matching precision cannot be obtained;
   having a matching check between the extracted biometric feature information and preliminarily registered biometric feature information;
   having a matching check between the obtained authentication information and the preliminarily registered additional authentication information; and
   computing matching precision by combining a matching check result about biometric feature information with a matching check result about additional authentication information, and determining based on a computation result whether or not a user is authenticated.

20. An authentication apparatus, comprising:
   biometric information input means for inputting biometric information;
   extraction means for extracting biometric feature information from the input biometric information;
   estimation means for estimating matching precision of the extracted biometric feature information;
   request means for requesting an input of additional authentication information different from the input biometric information when said estimation unit estimates that a predetermined matching precision cannot be obtained;
   authentication information input means for inputting the authentication information;
   biometric feature information registration means for preliminarily storing registered biometric feature information;
   authentication information registration means for preliminarily storing additional registered authentication information;
   biometric feature information matching check means for having a matching check between the extracted biometric feature information and the registered biometric feature information;
   authentication information matching check means for having a matching check between the input authentication information and the registered authentication information; and
   determination means for computing matching precision by combining a matching check result about biometric feature information with a matching check result about additional authentication information, and for determining based on a computation result whether or not a user is authenticated.

21. The apparatus according to claim 1, wherein said estimation unit estimates the matching precision of the extracted biometric feature information before the matching checks.

22. The apparatus according to claim 1, wherein said estimation unit estimates the matching precision of the extracted biometric feature information based on reproducibility of the extracted biometric feature information.

23. The apparatus according to claim 1, wherein said estimation unit estimates the matching precision of the extracted biometric feature information based on a quality of the extracted biometric feature information.

* * * * *